(12) United States Patent
Furusato et al.

(10) Patent No.: US 8,703,012 B2
(45) Date of Patent: *Apr. 22, 2014

(54) LIQUID CRYSTAL COMPOSITION AND LIQUID CRYSTAL DISPLAY DEVICE

(75) Inventors: Yoshimasa Furusato, Chiba (JP); Eriko Kurihara, Chiba (JP)

(73) Assignees: JNC Corporation, Tokyo (JP); JNC Petrochemical Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/582,053

(22) PCT Filed: May 9, 2011

(86) PCT No.: PCT/JP2011/060629
§ 371 (c)(1),
(2), (4) Date: Aug. 31, 2012

(87) PCT Pub. No.: WO2011/142302
PCT Pub. Date: Nov. 17, 2011

(65) Prior Publication Data
US 2013/0003009 A1    Jan. 3, 2013

(30) Foreign Application Priority Data

May 12, 2010    (JP) .................. 2010-110159

(51) Int. Cl.
| | |
|---|---|
| C09K 19/52 | (2006.01) |
| C09K 19/06 | (2006.01) |
| C09K 19/34 | (2006.01) |
| C09K 19/32 | (2006.01) |
| C09K 19/30 | (2006.01) |
| C09K 19/00 | (2006.01) |
| C09K 19/02 | (2006.01) |
| G02F 1/1333 | (2006.01) |

(52) U.S. Cl.
USPC .............. 252/299.6; 252/299.01; 252/299.61; 252/299.62; 252/299.63; 428/1.1; 428/1.3; 349/182; 349/183

(58) Field of Classification Search
USPC .................... 428/1.1, 1.3; 252/299.01, 299.6, 252/299.61, 299.62, 299.63; 349/182, 183
See application file for complete search history.

(56) References Cited

U.S. PATENT DOCUMENTS

2013/0048912 A1 * 2/2013 Ito .............................. 252/299.5

FOREIGN PATENT DOCUMENTS

| | | |
|---|---|---|
| CN | 101045866 | 10/2007 |
| JP | 2004-131704 | 4/2004 |
| JP | 2009-102639 | 5/2009 |
| WO | 2009/030318 | 3/2009 |
| WO | 2009/030322 | 3/2009 |

* cited by examiner

*Primary Examiner* — Geraldina Visconti
(74) *Attorney, Agent, or Firm* — Jianq Chyun IP Office

(57) ABSTRACT

To provide a liquid crystal composition satisfying at least one characteristic such as a high maximum temperature of a nematic phase, a low minimum temperature thereof, a small viscosity, a suitable optical anisotropy, a large negative dielectric anisotropy and specific resistance, a high stability to ultraviolet light and heat, or a liquid crystal composition having a suitable balance regarding at least two characteristics; an AM device having a short response time, a large voltage holding ratio and contrast ratio, a long service life and so forth; wherein the liquid crystal composition contains a specific compound having a polymerizable group as a first component, and may contain a specific compound having a large negative dielectric anisotropy and a low minimum temperature as a second component, or a specific compound having a small viscosity or a large maximum temperature as a third component, and a liquid crystal display device contains the composition.

17 Claims, No Drawings

LIQUID CRYSTAL COMPOSITION AND LIQUID CRYSTAL DISPLAY DEVICE

CROSS-REFERENCE TO RELATED APPLICATION

This application is a 371 of international application of PCT application serial no. PCT/JP2011/060629, filed on May 9, 2011, which claims the priority benefit of Japan application no. 2010-110159, filed on May 12, 2010. The entirety of each of the above-mentioned patent applications is hereby incorporated by reference herein and made a part of this specification.

TECHNICAL FIELD

The invention relates to a liquid crystal composition containing a polymerizable compound that is polymerized, for example, by light or heat. The invention also relates to a liquid crystal display device in which the liquid crystal composition is sealed between substrates, and the polymerizable compound contained in the liquid crystal composition is polymerized while adjusting a voltage to be applied to a liquid crystal layer to immobilize alignment of liquid crystals.

As the technical field of the invention, the invention relates to a liquid crystal composition mainly suitable for use in an active matrix (AM) device and so forth, and an AM device and so forth including the composition. More specifically, the invention relates to a liquid crystal composition having a negative dielectric anisotropy, and a device and so forth that include the composition and have a mode such as an in-plane switching (IPS) mode, a vertical alignment (VA) mode or a polymer sustained alignment (PSA) mode. The VA mode includes a multi-domain vertical alignment (MVA) mode and a patterned vertical alignment (PVA) mode.

BACKGROUND ART

In a liquid crystal display device, a classification based on an operating mode for liquid crystals includes a phase change (PC) mode, a twisted nematic (TN) mode, a super twisted nematic (STN) mode, an electrically controlled birefringence (ECB) mode, an optically compensated bend (OCB) mode, an in-plane switching (IPS) mode, a vertical alignment (VA) mode and a polymer sustained alignment (PSA) mode. A classification based on a driving mode in the device includes a passive matrix (PM) and an active matrix (AM). The PM is classified into static, multiplex and so forth, and the AM is classified into a thin film transistor (TFT), a metal insulator metal (MIM) and so forth. The TFT is further classified into amorphous silicon and polycrystal silicon. The latter is classified into a high temperature type and a low temperature type according to a production process. A classification based on a light source includes a reflective type utilizing natural light, a transmissive type utilizing backlight and a transflective type utilizing both the natural light and the backlight.

The devices include a liquid crystal composition having suitable characteristics. The liquid crystal composition has a nematic phase. General characteristics of the composition should be improved to obtain an AM device having good general characteristics. Table 1 below summarizes a relationship of the general characteristics between two aspects. The general characteristics of the composition will be further explained based on a commercially available AM device. A temperature range of the nematic phase relates to a temperature range in which the device can be used. A preferred maximum temperature of the nematic phase is about 70° C. or higher and a preferred minimum temperature of the nematic phase is about −10° C. or lower. Viscosity of the composition relates to a response time in the device. A short response time is preferred for displaying moving images on the device. Accordingly, a small viscosity in the composition is preferred. A small viscosity at a low temperature is further preferred.

TABLE 1

General Characteristics of Composition and AM Device

| General Characteristics of Composition | General Characteristics of AM Device |
|---|---|
| Wide temperature range of a nematic phase | Wide usable temperature range |
| Small viscosity [1] | Short response time |
| Suitable optical anisotropy | Large contrast ratio |
| Large positive or negative dielectric anisotropy | Low threshold voltage and small electric power consumption Large contrast ratio |
| Large specific resistance | Large voltage holding ratio and large contrast ratio |
| High stability to ultraviolet light and heat | Long service life |

[1] A liquid crystal composition can be injected into a liquid crystal cell in a shorter period of time.

An optical anisotropy of the composition relates to a contrast ratio in the device. A product ($\Delta n \times d$) of the optical anisotropy (an) of the composition and a cell gap (d) in the device is designed so as to maximize the contrast ratio. A suitable value of the product depends on a type of operating mode. The suitable value is in the range of about 0.30 micrometer to about 0.40 micrometer in a device having the VA mode or the PSA mode, and in the range of about 0.20 micrometer to about 0.30 micrometer in a device having the IPS mode. In the above case, a composition having a large optical anisotropy is preferred for a device having a small cell gap. A large absolute value of dielectric anisotropy in the composition contributes to a low threshold voltage, a small electric power consumption and a large contrast ratio in the device. Accordingly, the large absolute value of dielectric anisotropy is preferred. A large specific resistance in the composition contributes to a large voltage holding ratio and a large contrast ratio in the device. Accordingly, a composition having a large specific resistance at room temperature and also at a high temperature in an initial stage is preferred. A composition having a large specific resistance at room temperature and also at a high temperature even after the device has been used for a long period of time is preferred. Stability of the composition to ultraviolet light and heat relates to a service life of the liquid crystal display device. In the case where the stability is high, the device has a long service life. Such characteristics are preferred for an AM device used in a liquid crystal projector, a liquid crystal television and so forth.

A composition having a positive dielectric anisotropy is used in an AM device having the TN mode. On the other hand, a composition having a negative dielectric anisotropy is used in an AM device having the VA mode. A composition having a positive or negative dielectric anisotropy is used in an AM device having the IPS mode. A composition having a positive or negative dielectric anisotropy is used in an AM device having the PSA mode. Examples of the liquid crystal composition having the negative dielectric anisotropy are disclosed in Patent literatures No. 1 to No. 5 as described below and so forth.

REFERENCE LIST

Patent Literature

Patent literature No. 1: JP 2004-131704 A.
Patent literature No. 2: JP 2009-102639 A.
Patent literature No. 3: WO 2009/030318 A.
Patent literature No. 4: WO 2009/030322 A.
Patent literature No. 5: CN 101045866 A.

A desirable AM device has characteristics such as a wide temperature range in which a device can be used, a short response time, a large contrast ratio, a low threshold voltage, a large voltage holding ratio and a long service life. A shorter response time even by one millisecond is desirable. Thus, desirable characteristics of a composition include a high maximum temperature of a nematic phase, a low minimum temperature of the nematic phase, a small viscosity, a suitable optical anisotropy, a large positive or negative dielectric anisotropy, a large specific resistance, a high stability to ultraviolet light and a high stability to heat.

SUMMARY OF INVENTION

Technical Problem

In general, the polymerizable mesogenic compound or the polymerizable liquid crystal compound as described above has a high capability for aligning liquid crystal molecules. On the other hand, the compound has a poor solubility in a liquid crystal composition, and cannot be added in a large amount. In order to prevent crystallization during transportation or in a liquid crystal display device, a polymerizable compound having a high solubility in the liquid crystal composition is desirable.

One of the aims of the invention is to provide a liquid crystal composition satisfying at least one of characteristics such as a high maximum temperature of a nematic phase, a low minimum temperature of the nematic phase, a small viscosity, a suitable optical anisotropy, a large negative dielectric anisotropy, a large specific resistance, a high stability to ultraviolet light and a high stability to heat. Another aim is to provide a liquid crystal composition having a suitable balance regarding at least two of the characteristics. A further aim is to provide a liquid crystal display device including such a composition. An additional aim is to provide a composition having a suitable optical anisotropy to be a small optical anisotropy or a large optical anisotropy, a large negative dielectric anisotropy, a high stability to ultraviolet light and so forth, and is to provide an AM device having a short response time, a large voltage holding ratio, a large contrast ratio, a long service life and so forth.

Solution to Problem

The invention concerns a liquid crystal composition containing at least one compound selected from the group of compounds represented by formula (1) as a first component, and a liquid crystal display device including the composition:

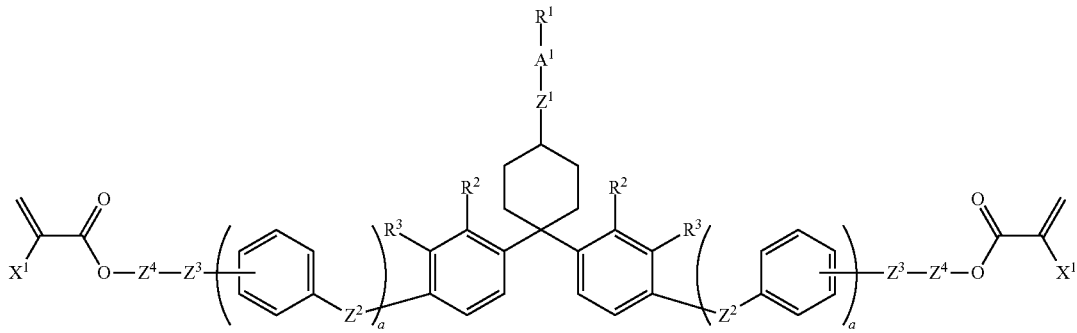

(1)

In a display having a PSA mode, a small amount (about 0.3% by weight, typically, less than about 1% by weight, for example) of a polymerizable compound (RM) is added to a liquid crystal composition. After introduction into a liquid crystal display cell, only the polymerizable compound is polymerized ordinarily under irradiation with ultraviolet light in a state in which a voltage is applied between electrodes to form a polymer structure within the device. As the RM, a polymerizable mesogenic compound or a polymerizable liquid crystal compound is known to be particularly suitable as a monomer to be added to the liquid crystal composition.

wherein $R^1$ is hydrogen or alkyl having 1 to 20 carbons, and in the alkyl, arbitrary —$CH_2$— may be replaced by —O—, —CH=CH— or —C≡C—; $R^2$ and $R^3$ are hydrogen or methyl; $A^1$ is a single bond, 1,4-phenylene or 1,4-cyclohexylene; $Z^1$ is a single bond or alkylene having 1 to 3 carbons; $Z^2$ is —O— or alkylene having 1 to 6 carbons; $Z^3$ is a single bond or —O—; $Z^4$ is a single bond or alkylene having 2 to 20 carbons, and in the alkylene, arbitrary —$CH_2$— may be replaced by —O—; $X^1$ is hydrogen, halogen, alkyl having 1 to 3 carbons or fluoroalkyl having 1 to 3 carbons; a is 0 or 1; and in the formula, arbitrary hydrogen on an arbitrary phenylene ring may be replaced by methyl, cyclohexyl or halogen.

Advantageous Effects of Invention

An advantage of the invention is a high solubility of a polymerizable compound in a liquid crystal composition.

Another advantage of the invention is a liquid crystal composition satisfying at least one of characteristics such as a high maximum temperature of a nematic phase, a low minimum temperature of the nematic phase, a small viscosity, a suitable optical anisotropy, a large negative dielectric anisotropy, a large specific resistance, a high stability to ultraviolet light and a high stability to heat. One aspect of the invention is a liquid crystal composition having a suitable balance regarding at least two of the characteristics. Another aspect is a liquid crystal display device including such a composition. A further aspect is a polymerizable compound having a high solubility, a composition having a suitable optical anisotropy, a large negative dielectric anisotropy, a high stability to ultraviolet light and so forth, and an AM device having a short response time, a large voltage holding ratio, a large contrast ratio, a long service life and so forth.

DESCRIPTION OF EMBODIMENTS

Usage of terms herein is as described below. A liquid crystal composition or a liquid crystal display device of the invention may be abbreviated as "composition" or "device," respectively. The liquid crystal display device is a generic term for a liquid crystal display panel and a liquid crystal display module. "Liquid crystal compound" means a compound having a liquid crystal phase such as a nematic phase or a smectic phase, or a compound having no liquid crystal phase but being useful as a component of the composition. Such a useful compound has a six-membered ring such as 1,4-cyclohexylene and 1,4-phenylene, and a rod-like molecular structure. An optically active compound and a polymerizable compound may occasionally be added to the composition. Even in the case where the compounds are liquid crystalline, the compounds are classified as an additive herein. At least one compound selected from the group of compounds represented by formula (1) may be abbreviated as "compound (1)." "Compound (1)" means one compound or two or more compounds represented by formula (1). A same rule also applies to any other compound represented by any other formula. "Arbitrary" means a free selection of not only positions but also numbers.

A higher limit of a temperature range of the nematic phase may be abbreviated as "maximum temperature." A lower limit of the temperature range of the nematic phase may be abbreviated as "minimum temperature." An expression "having a large specific resistance" means that the composition has a large specific resistance at room temperature and also at a temperature close to the maximum temperature of the nematic phase in an initial stage, and that the composition has a large specific resistance at room temperature and also at a temperature close to the maximum temperature of the nematic phase even after the device has been used for a long period of time. An expression "having a large voltage holding ratio" means that the device has a large voltage holding ratio at room temperature and also at a temperature close to the maximum temperature of the nematic phase in an initial stage, and that the device has a large voltage holding ratio at room temperature and also at a temperature close to the maximum temperature of the nematic phase even after the device has been used for a long period of time. When characteristics such as an optical anisotropy are explained, values obtained according to the measuring methods described in Examples will be used. A first component includes one compound or two or more compounds. "Ratio of the first component" is expressed in terms of a weight ratio (part by weight) of the first component based on 100 parts by weight of a liquid crystal composition excluding the first component. "Ratio of a second component" means weight percent (% by weight) of the second component based on the weight of the liquid crystal composition excluding the first component. "Ratio of a third component" is expressed in a manner similar to "ratio of the second component." A ratio of the additive mixed with the composition is expressed in terms of weight percent (% by weight) or weight parts per million (ppm) based on the total weight of the liquid crystal composition.

A symbol $R^{11}$ is used for a plurality of compounds in chemical formulas of component compounds. In two of arbitrary compounds among the plurality of compounds, a group selected by $R^{11}$ may be identical or different. In one case, for example, $R^{11}$ of compound (2-1) is ethyl and $R^{11}$ of compound (2-2) is ethyl. In another case, $R^{11}$ of compound (2-1) is ethyl and $R^{11}$ of compound (2-2) is propyl. A same rule also applies to a symbol $R^{12}$, $Z^{11}$ or the like.

The invention includes the items described below.

Item 1. A liquid crystal composition containing at least one compound selected from the group of compounds represented by formula (1) as a first component:

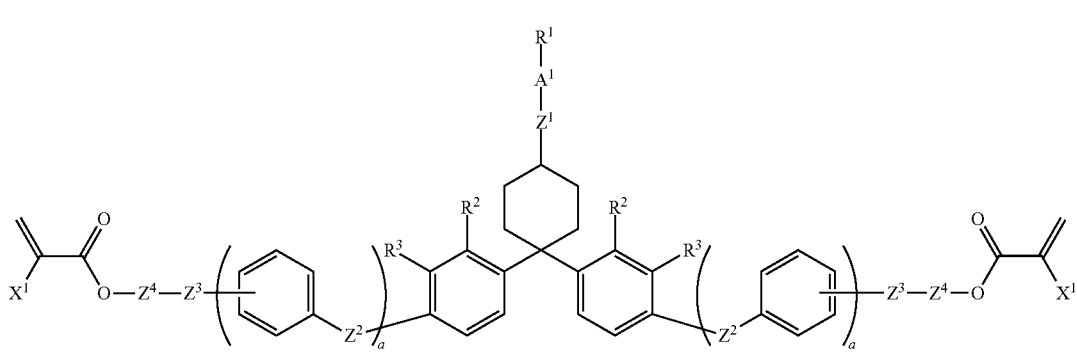

(1)

wherein $R^1$ is hydrogen or alkyl having 1 to 20 carbons, and in the alkyl, arbitrary —$CH_2$— may be replaced by —O—, —CH=CH— or —C≡C—; $R^2$ and $R^3$ are hydrogen or methyl; $A^1$ is a single bond, 1,4-phenylene or 1,4-cyclohexylene; $Z^1$ is a single bond or alkylene having 1 to 3 carbons; $Z^2$ is —O— or alkylene having 1 to 6 carbons; $Z^3$ is a single bond or —O—; $Z^4$ is a single bond or alkylene having 2 to 20 carbons, and in the alkylene, arbitrary —$CH_2$— may be replaced by —O—; $X^1$ is hydrogen, halogen, alkyl having 1 to 3 carbons or fluoroalkyl having 1 to 3 carbons; a is 0 or 1; and in the formula, arbitrary hydrogen on an arbitrary phenylene ring may be replaced by methyl, cyclohexyl or halogen.

Item 2. The liquid crystal composition according to item 1, wherein $A^1$ is a single bond or 1,4-cyclohexylene, a is 0 and $X^1$ is hydrogen or alkyl having 1 to 3 carbons.

Item 3. The liquid crystal composition according to item 1 or 2, wherein a ratio of the first component is in the range of 0.05 part by weight to 10 parts by weight based on 100 parts by weight of a liquid crystal composition excluding the first component.

Item 4. The liquid crystal composition according to any one of items 1 to 3, further containing at least one compound selected from the group of compounds represented by formula (2) as a second component:

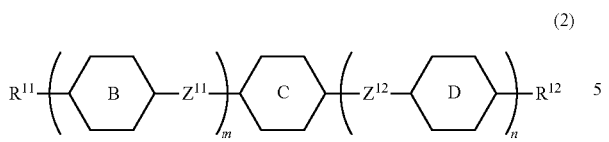
(2)

wherein $R^{11}$ and $R^{12}$ are independently alkyl having 1 to 12 carbons, alkoxy having 1 to 12 carbons or alkenyl having 2 to 12 carbons, or alkenyl having 2 to 12 carbons in which arbitrary hydrogen is replaced by fluorine; ring B and ring D are independently 1,4-cyclohexylene, 1,4-phenylene, 1,4-phenylene in which arbitrary hydrogen is replaced by fluorine or chlorine, or tetrahydropyran-2,5-diyl; ring C is 2,3-difluoro-1,4-phenylene, 2-chloro-3-fluoro-1,4-phenylene, 2,3-difluoro-5-methyl-1,4-phenylene, 3,4,5-trifluoronaphthalene-2,6-diyl or 7,8-difluorochroman-2,6-diyl; $Z^{11}$ and $Z^{12}$ are independently a single bond, ethylene, methyleneoxy or carbonyloxy; and m is 1, 2 or 3, n is 0 or 1, and a sum of m and n is 3 or less.

Item 5. The liquid crystal composition according to item 4, wherein the second component is at least one compound selected from the group of compounds represented by formula (2-1) to formula (2-23):

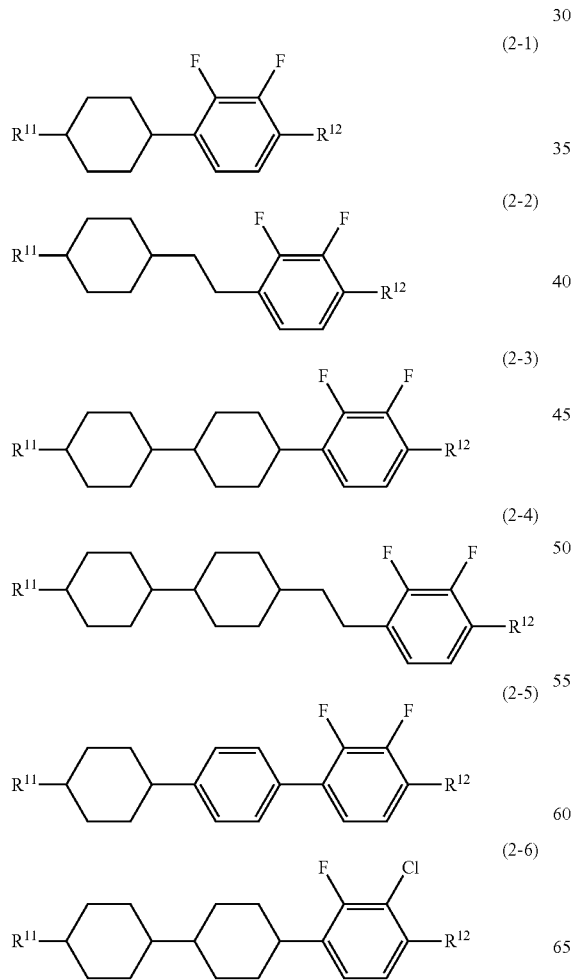

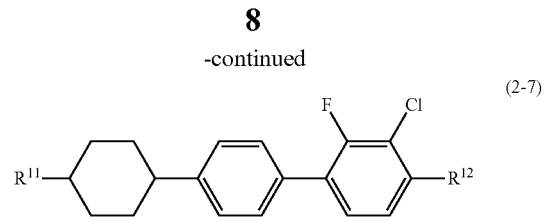

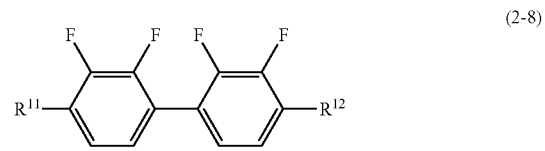

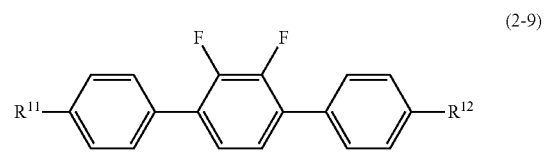

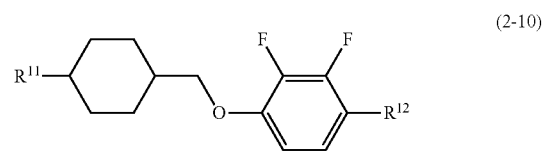

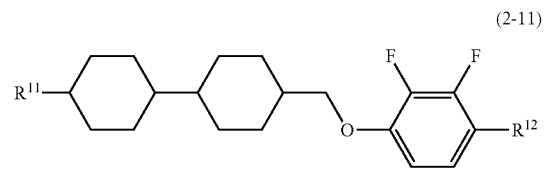

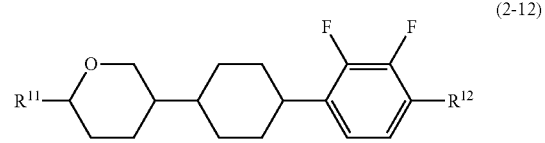

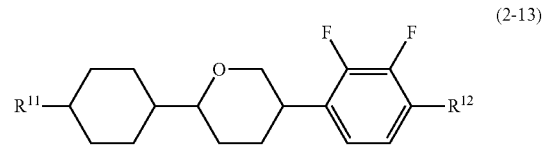

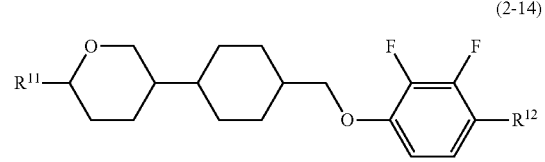

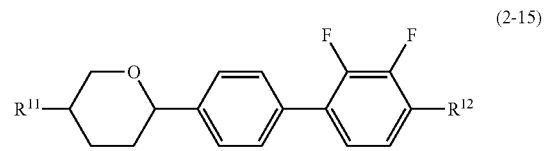

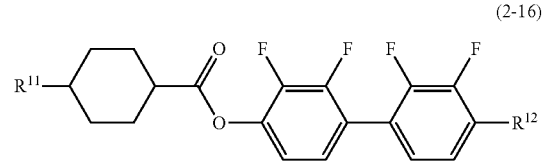

-continued

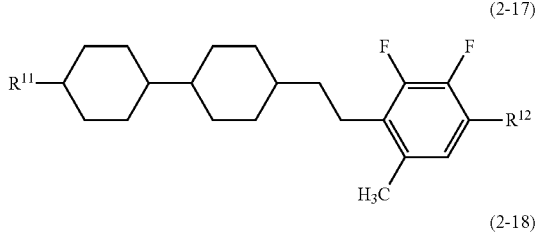
(2-17)

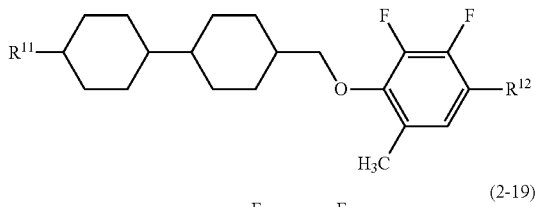
(2-18)

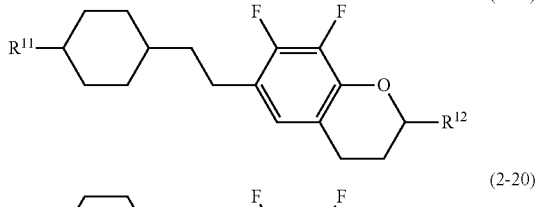
(2-19)

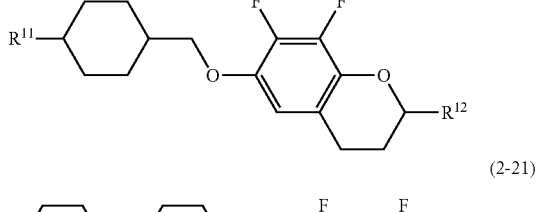
(2-20)

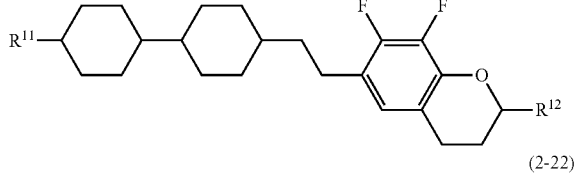
(2-21)

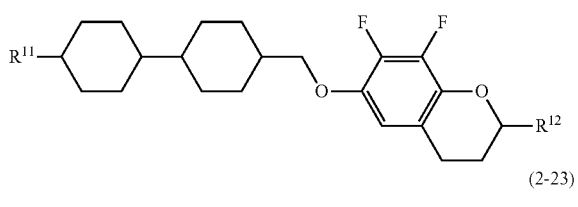
(2-22)

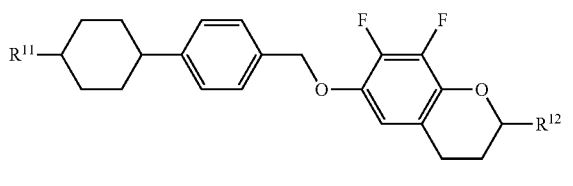
(2-23)

wherein $R^{11}$ and $R^{12}$ are independently alkyl having 1 to 12 carbons, alkoxy having 1 to 12 carbons or alkenyl having 2 to 12 carbons, or alkenyl having 2 to 12 carbons in which arbitrary hydrogen is replaced by fluorine.

Item 6. The liquid crystal composition according to item 5, wherein the second component is at least one compound selected from the group of compounds represented by formula (2-1).

Item 7. The liquid crystal composition according to item 5, wherein the second component is a mixture of at least one compound selected from the group of compounds represented by formula (2-1) and at least one compound selected from the group of compounds represented by formula (2-3).

Item 8. The liquid crystal composition according to item 5, wherein the second component is a mixture of at least one compound selected from the group of compounds represented by formula (2-1) and at least one compound selected from the group of compounds represented by formula (2-5).

Item 9. The liquid crystal composition according to item 5, wherein the second component is at least one compound selected from the group of compounds represented by formula (2-22).

Item 10. The liquid crystal composition according to any one of items 4 to 9, wherein a ratio of the second component is in the range of 10% by weight to 90% by weight based on the weight of a liquid crystal composition excluding the first component.

Item 11. The liquid crystal composition according to any one of items 1 to 10, further containing at least one compound selected from the group of compounds represented by formula (3) as a third component:

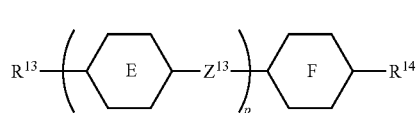
(3)

wherein $R^{13}$ and $R^{14}$ are independently alkyl having 1 to 12 carbons, alkoxy having 1 to 12 carbons or alkenyl having 2 to 12 carbons, or alkenyl having 2 to 12 carbons in which arbitrary hydrogen is replaced by fluorine; ring E and ring F are independently 1,4-cyclohexylene, 1,4-phenylene, 2-fluoro-1,4-phenylene or 3-fluoro-1,4-phenylene; $Z^{13}$ is independently a single bond, ethylene, methyleneoxy or carbonyloxy; and p is 1, 2 or 3.

Item 12. The liquid crystal composition according to item 11, wherein the third component is at least one compound selected from the group of compounds represented by formula (3-1) to formula (3-13):

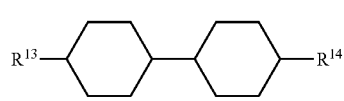
(3-1)

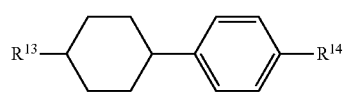
(3-2)

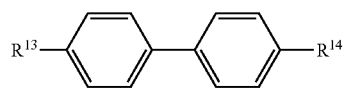
(3-3)

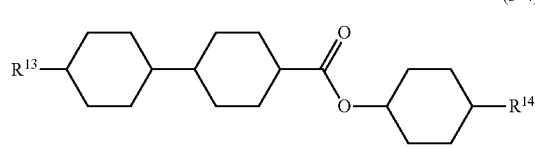
(3-4)

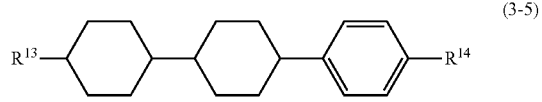
(3-5)

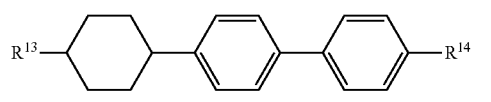
(3-6)

-continued

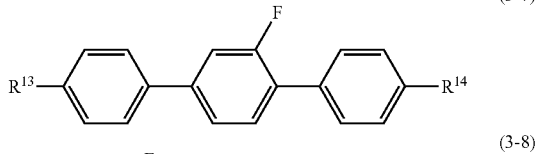
(3-7)

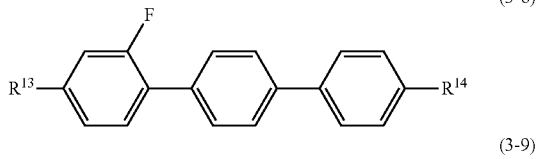
(3-8)

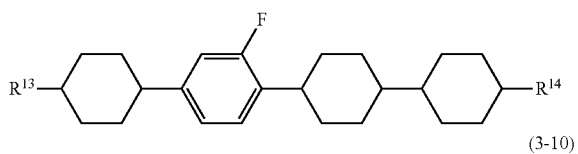
(3-9)

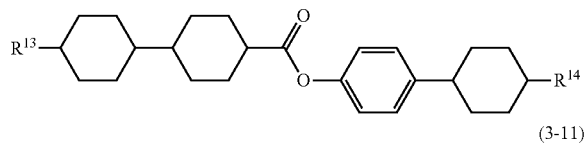
(3-10)

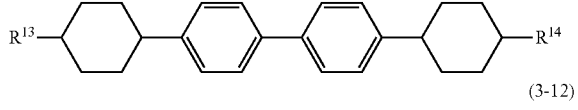
(3-11)

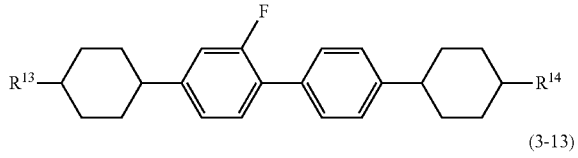
(3-12)

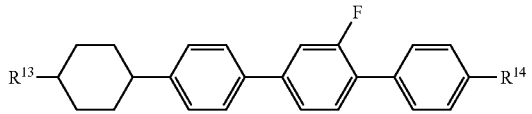
(3-13)

wherein $R^{13}$ and $R^{14}$ are independently alkyl having 1 to 12 carbons, alkoxy having 1 to 12 carbons or alkenyl having 2 to 12 carbons, or alkenyl having 2 to 12 carbons in which arbitrary hydrogen is replaced by fluorine.

Item 13. The liquid crystal composition according to item 12, wherein the third component is at least one compound selected from the group of compounds represented by formula (3-5).

Item 14. The liquid crystal composition according to item 12, wherein the third component is at least one compound selected from the group of compounds represented by formula (3-8).

Item 15. The liquid crystal composition according to any one of items 11 to 14, wherein a ratio of the third component is in the range of 10% by weight to 90% by weight based on the weight of a liquid crystal composition excluding the first component.

Item 16. The liquid crystal composition according to any one of items 1 to 15, further containing a polymerization initiator.

Item 17. The liquid crystal composition according to any one of items 1 to 16, further containing a polymerization inhibitor.

Item 18. The liquid crystal composition according to any one of items 1 to 17, wherein a maximum temperature of a nematic phase is 70° C. or higher, an optical anisotropy (25° C.) at a wavelength of 589 nanometers is 0.08 or more, and a dielectric anisotropy (25° C.) at a frequency of 1 kHz is −2 or less.

Item 19. A liquid crystal display device, comprising two substrates including an electrode layer on at least one of the substrates, and arranging between the two substrates the liquid crystal composition according to any one of items 1 to 18.

Item 20. The liquid crystal display device according to item 19, wherein an operating mode in the liquid crystal display device is a TN mode, a VA mode, an IPS mode or a PSA mode, and a driving mode in the liquid crystal display device is an active matrix mode.

The invention further includes the following items: (1) the composition, further containing the optically active compound; (2) the composition, further containing the additive such as an antioxidant, an ultraviolet light absorber or an antifoaming agent; (3) an AM device including the composition; (4) a device including the composition, and having a TN, an ECB, an OCB, an IPS, a VA or a PSA mode; (5) a transmissive device including the composition; (6) use of the composition as the composition having the nematic phase; and (7) use as an optically active composition by adding the optically active compound to the composition.

The composition of the invention will be explained in the following order. First, a constitution of the component compounds in the composition will be explained. Second, main characteristics of the component compounds and main effects of the compounds on the composition will be explained. Third, a combination of components in the composition, a preferred ratio of the component compounds and the basis thereof will be explained. Fourth, a preferred embodiment of the component compounds will be explained. Fifth, specific examples of the component compounds will be shown. Sixth, the additive that may be mixed with the composition will be explained. Seventh, methods for synthesizing the component compounds will be explained. Last, an application of the composition will be explained.

First, the constitution of the component compounds in the composition will be explained. The composition of the invention is classified into composition A and composition B. Composition A may further contain any other liquid crystal compound, the additive and an impurity. "Any other liquid crystal compound" means a liquid crystal compound different from compound (1), compound (2) and compound (3). Such a compound is mixed with the composition for the purpose of further adjusting the characteristics. Of any other liquid crystal compounds, a ratio of a cyano compound is preferably as small as possible in view of stability to heat or ultraviolet light. A further preferred ratio of the cyano compound is 0% by weight. The additive includes the optically active compound, the antioxidant, the ultraviolet light absorber, a dye, the antifoaming agent, the polymerizable compound and the polymerization initiator. The impurity includes a compound mixed in a process such as preparation of the component compounds. Even in the case where the compound is liquid crystalline, the compound is classified as the impurity herein.

Composition B consists essentially of compound (1), compound (2) and compound (3). A term "essentially" means that the composition may contain the additive and the impurity, but does not contain any liquid crystal compound different from the compounds. Composition B has a smaller number of components than composition A has. Composition B is preferred to composition A in view of cost reduction. Composition A is preferred to composition B in view of possibility of further adjusting physical properties by mixing any other liquid crystal compound.

Second, the main characteristics of the component compounds and the main effects of the compounds on the characteristics of the composition will be explained. The main characteristics of the component compounds are summarized in Table 2 on the basis of advantageous effects of the invention. In Table 2, a symbol L stands for "large" or "high," a symbol M stands for "medium," and a symbol S stands for "small" or "low." The symbols L, M and S represent a classification based on a qualitative comparison among the component compounds, and 0 (zero) means "a value is close to zero."

TABLE 2

Characteristics of Compounds

| Compounds | Compound (2) | Compound (3) |
|---|---|---|
| Maximum temperature | S to L | S to L |
| Viscosity | M to L | S to M |
| Optical anisotropy | M to L | S to L |
| Dielectric anisotropy | M to L [1)] | 0 |
| Specific resistance | L | L |

[1)] A value of dielectric anisotropy is negative, and the symbol shows magnitude of an absolute value.

Upon mixing the component compounds with the composition, the main effects of the component compounds on the characteristics of the composition are as described below. Compound (2) increases the absolute value of dielectric anisotropy and decreases the minimum temperature. Compound (3) decreases the viscosity or increases the maximum temperature.

Third, the combination of components in the composition, the preferred ratio of the components and the basis thereof will be explained. The combination of components in the composition includes a combination of the first component and the second component, a combination of the first component and the third component, and a combination of the first component, the second component and the third component.

A preferred ratio of the first component is about 0.05 part by weight or more for achieving the effect thereof, and about 10 parts by weight or less for avoiding a poor display, based on 100 parts by weight of the liquid crystal composition excluding the first component. A further preferred ratio is in the range of about 0.1 part by weight to about 2 parts by weight.

A preferred ratio of the second component is about 10% by weight or more for increasing the absolute value of dielectric anisotropy, and about 90% by weight or less for decreasing the minimum temperature, based on the liquid crystal composition excluding the first component. A further preferred ratio is in the range of about 20% by weight to about 80% by weight. A particularly preferred ratio is in the range of about 30% by weight to about 70% by weight.

A preferred ratio of the third component is about 10% by weight or more for decreasing the viscosity or increasing the maximum temperature, and about 90% or less for increasing the absolute value of dielectric anisotropy, based on the liquid crystal composition excluding the first component. A further preferred ratio is in the range of about 20% by weight to about 80% by weight. A particularly preferred ratio is in the range of about 30% by weight to about 70% by weight.

Fourth, the preferred embodiment of the component compounds will be explained. $R^1$ is hydrogen or alkyl having 1 to 20 carbons, and in the alkyl, arbitrary —$CH_2$— may be replaced by —O—, —CH=CH— or —C≡C—. Preferred $R^1$ is hydrogen or alkyl having 1 to 20 carbons. $R^2$ and $R^3$ are hydrogen or methyl. Preferred $R^2$ and $R^3$ are hydrogen. $R^{11}$, $R^{12}$, $R^{13}$ and $R^{14}$ are independently alkyl having 1 to 12 carbons, alkoxy having 1 to 12 carbons or alkenyl having 2 to 12 carbons, or alkenyl having 2 to 12 carbons in which arbitrary hydrogen is replaced by fluorine. Preferred $R^{11}$ or $R^{12}$ is alkyl having 1 to 12 carbons for increasing the stability to ultraviolet light, or the like, or increasing the stability to heat, and alkoxy having 1 to 12 carbons for increasing the absolute value of dielectric anisotropy. Preferred $R^{13}$ or $R^{14}$ is alkyl having 1 to 12 carbons for increasing the stability to ultraviolet light or the stability to heat, and alkenyl having 2 to 12 carbons for decreasing the minimum temperature.

Preferred alkyl is methyl, ethyl, propyl, butyl, pentyl, hexyl, heptyl or octyl. Further preferred alkyl is ethyl, propyl, butyl, pentyl or heptyl for decreasing the viscosity.

Preferred alkylene is methylene, ethylene, propylene, butylene, pentylene, hexylene, heptylene or octylene. Further preferred alkylene is methylene, ethylene, butylene, pentylene or heptylene for decreasing the viscosity.

Preferred alkoxy is methoxy, ethoxy, propoxy, butoxy, pentyloxy, hexyloxy or heptyloxy. Further preferred alkoxy is methoxy or ethoxy for decreasing the viscosity.

Preferred alkenyl is vinyl, 1-propenyl, 2-propenyl, 1-butenyl, 2-butenyl, 3-butenyl, 1-pentenyl, 2-pentenyl, 3-pentenyl, 4-pentenyl, 1-hexenyl, 2-hexenyl, 3-hexenyl, 4-hexenyl or 5-hexenyl. Further preferred alkenyl is vinyl, 1-propenyl, 3-butenyl or 3-pentenyl for decreasing the viscosity. A preferred configuration of —CH=CH— in the alkenyl depends on a position of a double bond. Trans is preferred in the alkenyl such as 1-propenyl, 1-butenyl, 1-pentenyl, 1-hexenyl, 3-pentenyl and 3-hexenyl for decreasing the viscosity, for instance. Cis is preferred in the alkenyl such as 2-butenyl, 2-pentenyl and 2-hexenyl. In the alkenyl, straight-chain alkenyl is preferred to branched-chain alkenyl.

Preferred examples of alkenyl in which arbitrary hydrogen is replaced by fluorine include 2,2-difluorovinyl, 3,3-difluoro-2-propenyl, 4,4-difluoro-3-butenyl, 5,5-difluoro-4-pentenyl and 6,6-difluoro-5-hexenyl. Further preferred examples include 2,2-difluorovinyl and 4,4-difluoro-3-butenyl for decreasing the viscosity.

$A^1$ is a single bond, 1,4-phenylene or 1,4-cyclohexylene. Preferred $A^1$ is a single bond or 1,4-cyclohexylene. Ring B and ring D are independently 1,4-cyclohexylene, 1,4-phenylene, 1,4-phenylene in which arbitrary hydrogen is replaced by fluorine or chlorine, or tetrahydropyran-2,5-diyl. Tetrahydropyran-2,5-diyl includes:

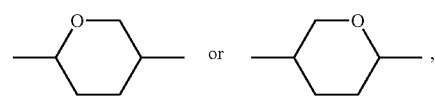

preferably,

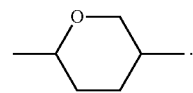

Ring C is 2,3-difluoro-1,4-phenylene, 2-chloro-3-fluoro-1,4-phenylene, 2,3-difluoro-5-methyl-1,4-phenylene, 3,4,5-trifluoronaphthalene-2,6-diyl or 7,8-difluorochroman-2,6-diyl. Two of arbitrary ring B when m is 2 or 3 may be identical or different. Preferred ring B or ring D is 1,4-cyclohexylene for decreasing the viscosity. Preferred ring C is 2,3-difluoro-1,4-phenylene for decreasing the viscosity and increasing the absolute value of dielectric anisotropy. Ring E and ring F are independently 1,4-cyclohexylene, 1,4-phenylene, 2-fluoro-1,4-phenylene or 3-fluoro-1,4-phenylene, and two of arbitrary ring E when p is 2 or 3 may be identical or different. Preferred ring E or ring F is 1,4-cyclohexylene for decreasing the viscosity, and 1,4-phenylene for increasing the optical anisotropy.

$Z^1$ is a single bond or alkylene having 1 to 3 carbons. Preferred $Z^1$ is a single bond.

$Z^2$ is —O— or alkylene having 1 to 6 carbons. Preferred $Z^2$ is alkylene having 1 to 6 carbons. $Z^3$ is a single bond or —O—. Preferred $Z^3$ is a single bond. $Z^4$ is a single bond or alkylene having 2 to 20 carbons, and in the alkylene, arbitrary —CH$_2$— may be replaced by —O—. Preferred $Z^4$ is a single bond. $X^1$ is hydrogen, halogen, alkyl having 1 to 3 carbons or fluoroalkyl having 1 to 3 carbons. Preferred $X^1$ is alkyl having 1 to 3 carbons. $Z^{11}$ is independently hydrogen, fluorine, chlorine, methyl or —CF$_3$. Preferred $Z^{11}$ is hydrogen or methyl. $Z^{12}$, $Z^{13}$ and $Z^{14}$ are independently a single bond, ethylene, methyleneoxy or carbonyloxy, two of arbitrary $Z^{12}$ when m is 2 or 3 may be identical or different, and two of arbitrary $Z^{14}$ when p is 2 or 3 may be identical or different. Preferred $Z^{12}$ or $Z^{13}$ is a single bond for decreasing the viscosity, and methyleneoxy for increasing the absolute value of dielectric anisotropy. Preferred $Z^{14}$ is a single bond for decreasing the viscosity.

Then, a is 0 or 1. Preferred a is 0. Herein, m is 1, 2 or 3, n is 0 or 1, and a sum of m and n is 3 or less. Preferred m is 1 for decreasing the minimum temperature. Preferred n is 0 for decreasing the viscosity. Moreover, p is 1, 2 or 3. Preferred p is 1 for decreasing the viscosity, and 3 for increasing the maximum temperature. Furthermore, j and q are an integer from 0 to 10, k and r are 0 or 1, k when j is 0 is 0, and r when q is 0 is 0. Preferred j or q is 2 for increasing photoreactivity, and 0 for increasing alignment properties. Preferred k or r is 1 for increasing the photoreactivity, and 0 for increasing the alignment properties.

Fifth, the specific examples of the component compounds will be shown. In the preferred compounds described below, $R^4$ is alkyl having 1 to 20 carbons. $R^{15}$ is straight-chain alkyl having 1 to 12 carbons, or straight-chain alkoxy having 1 to 12 carbons. $R^{16}$ and $R^{17}$ are independently straight-chain alkyl having 1 to 12 carbons or straight-chain alkenyl having 2 to 12 carbons. With regard to a configuration of 1,4-cyclohexylene in the compounds, trans is preferred to cis for increasing the maximum temperature.

Preferred compound (1) includes compound (1-1) and compound (1-2). Preferred compound (2) includes compound (2-1-1) to compound (2-23-1). Further preferred compound (2) includes compound (2-1-1) to compound (2-3-1), compound (2-5-1), compound (2-8-1), compound (2-11-1), compound (2-13-1) and compound (2-22-1). Particularly preferred compound (2) includes compound (2-1-1), compound (2-3-1), compound (2-5-1) and compound (2-22-1). Preferred compound (3) includes compound (3-1-1) to compound (3-13-1). Further preferred compound (3) includes compound (3-1-1), compound (3-5-1), compound (3-8-1), compound (3-9-1) and compound (3-10-1). Particularly preferred compound (3) includes compound (3-1-1), compound (3-5-1) and compound (3-8-1).

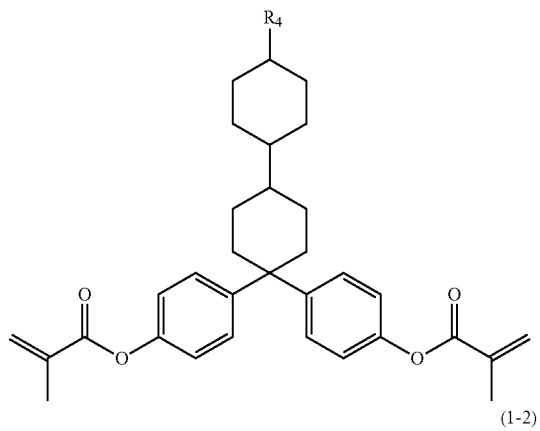

(1-1)

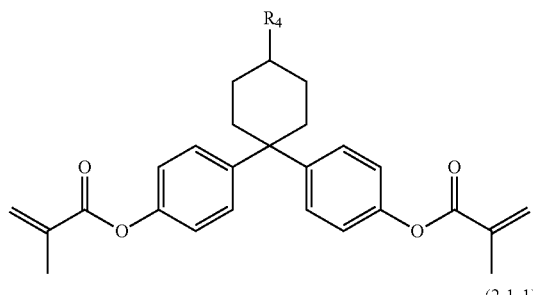

(1-2)

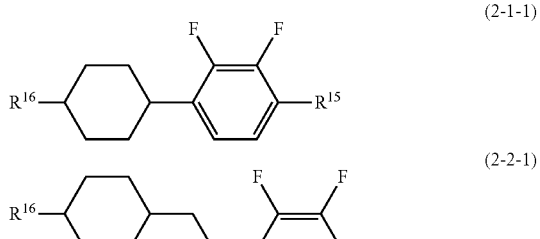

(2-1-1)

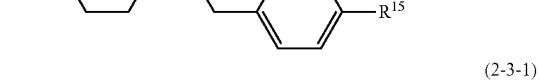

(2-2-1)

(2-3-1)

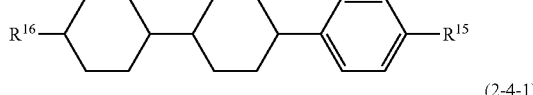

(2-4-1)

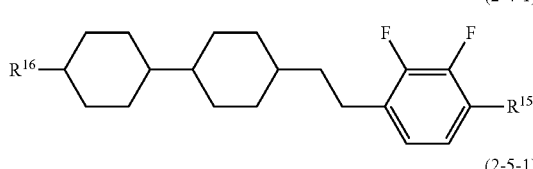

(2-5-1)

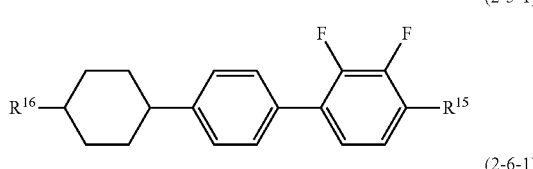

(2-6-1)

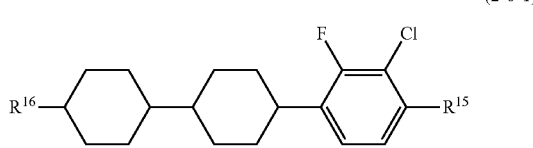

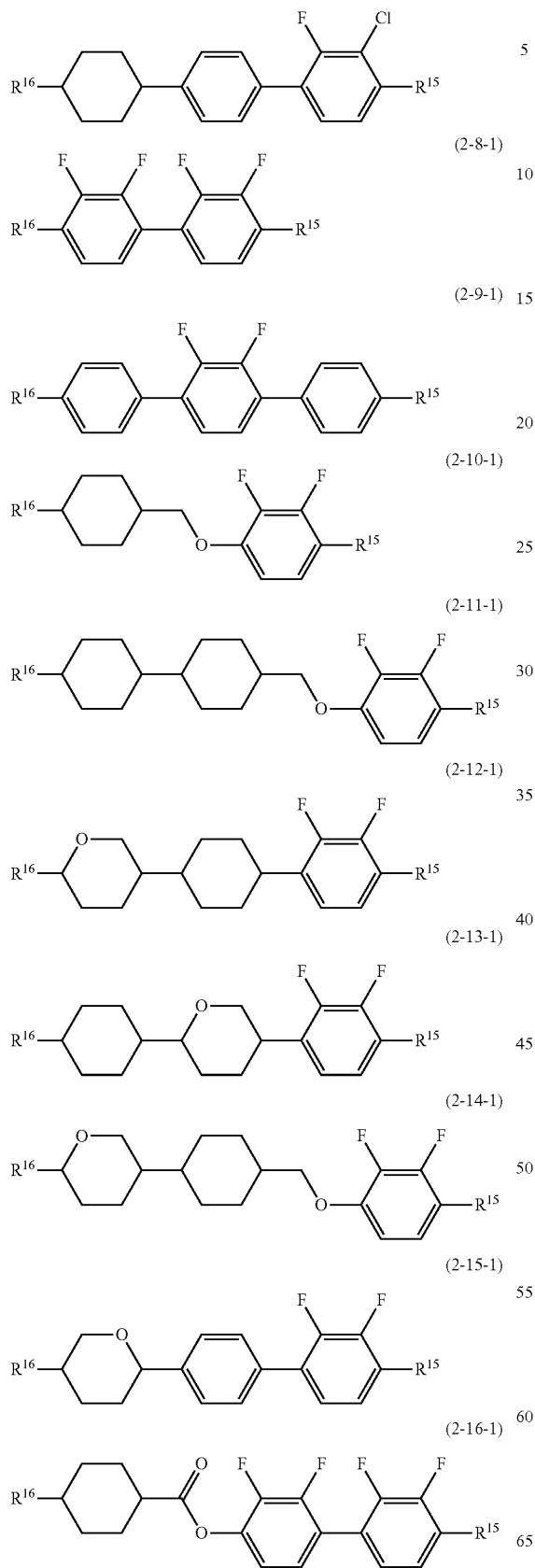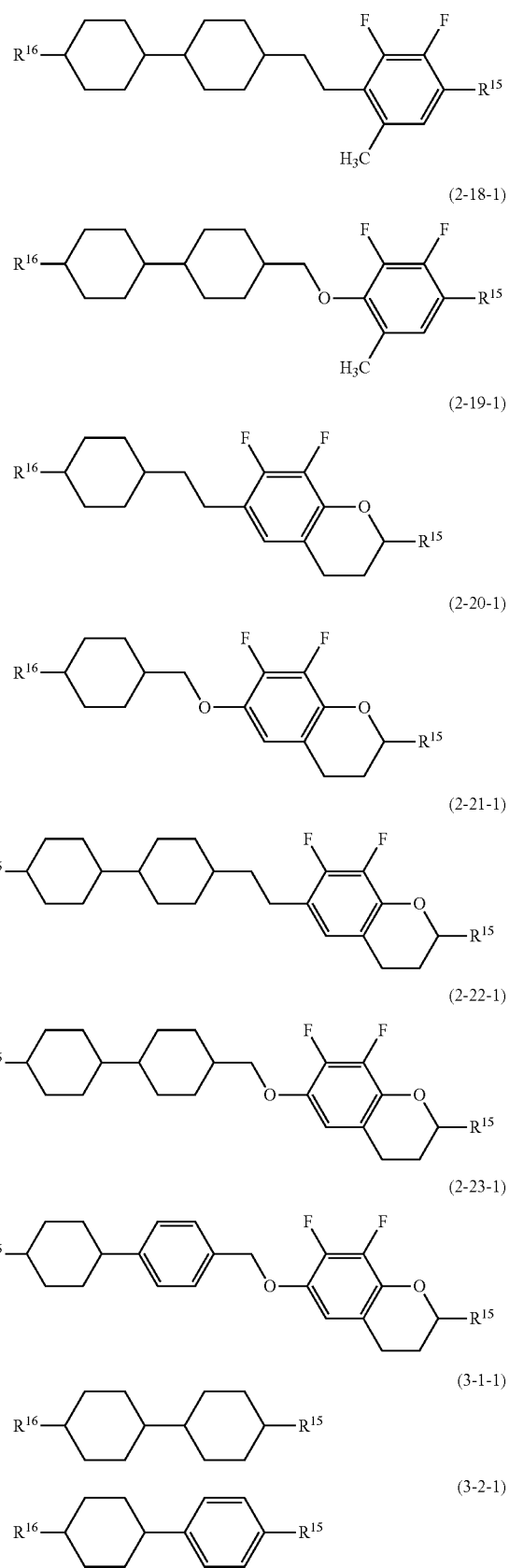

-continued

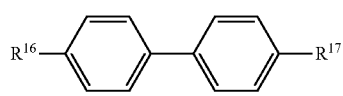 (3-3-1)

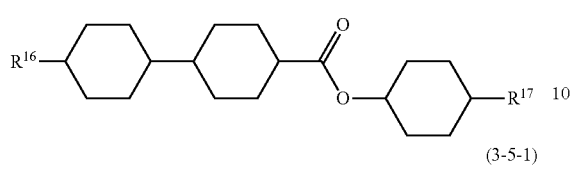 (3-4-1)

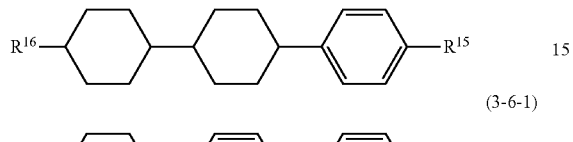 (3-5-1)

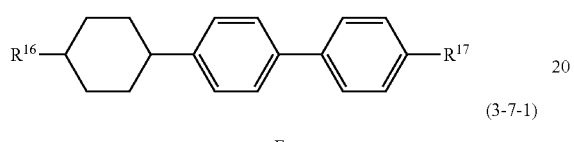 (3-6-1)

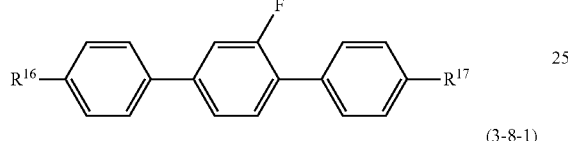 (3-7-1)

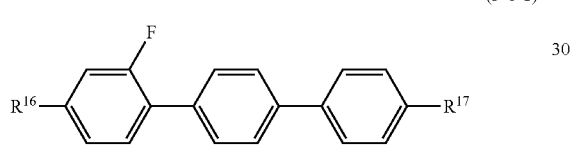 (3-8-1)

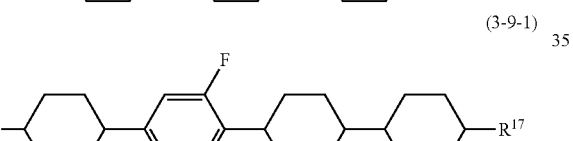 (3-9-1)

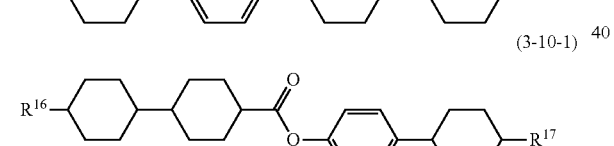 (3-10-1)

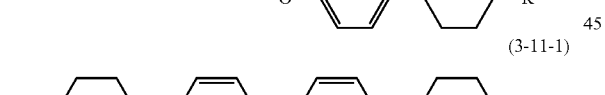 (3-11-1)

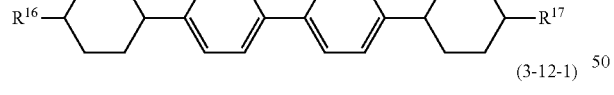 (3-12-1)

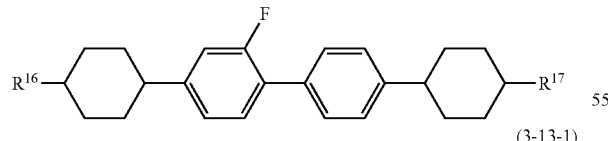 (3-13-1)

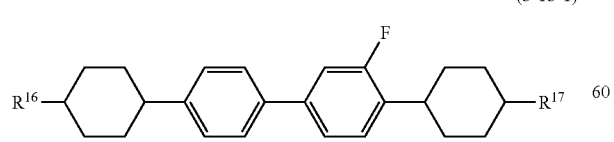

Sixth, the additive that may be mixed with the composition will be explained. Such an additive includes the optically active compound, the antioxidant, the ultraviolet light absorber, the dye, the antifoaming agent, the polymerization initiator and the polymerization inhibitor. The optically active compound is mixed with the composition for the purpose of inducing a helical structure in liquid crystals to give a twist angle. Examples of such a compound include compound (4-1) to compound (4-4). A preferred ratio of the optically active compound is about 5% by weight or less. A further preferred ratio is in the range of about 0.01% by weight to about 2% by weight.

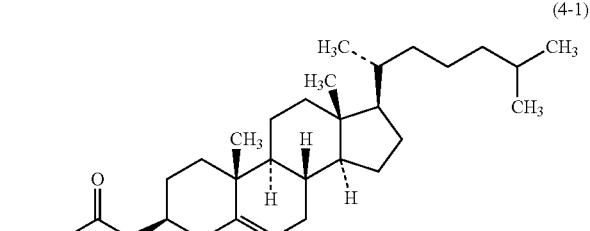 (4-1)

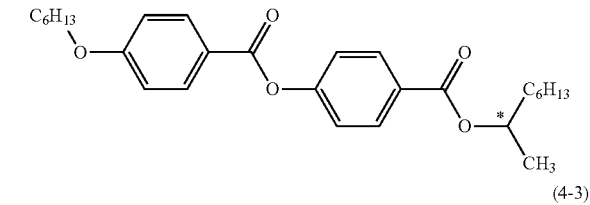 (4-2)

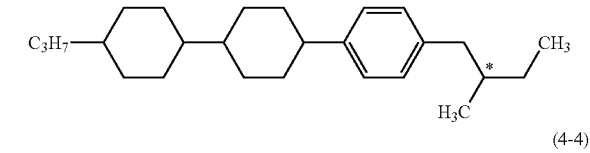 (4-3)

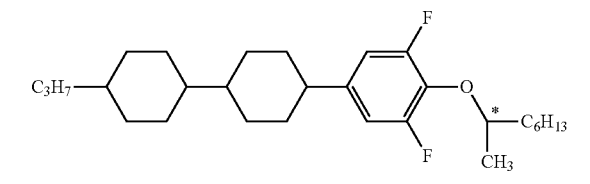 (4-4)

The antioxidant is mixed with the composition for the purpose of preventing a decrease in the specific resistance caused by heating in air, or maintaining a large voltage holding ratio at room temperature and also at a temperature close to the maximum temperature of the nematic phase even after the device has been used for a long period of time.

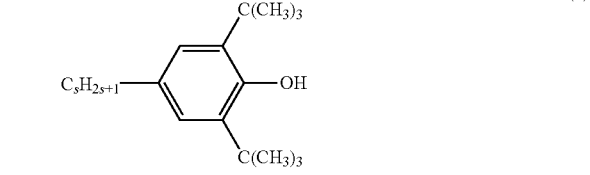 (5)

Preferred examples of the antioxidant include compound (5) where is an integer from 1 to 9. In compound (5), preferred s is 1, 3, 5, 7 or 9. Further preferred s is 1 or 7. Compound (5) where s is 1 is effective in preventing a decrease in the specific resistance caused by heating in air because the compound (5) has a large volatility. Compound (5) where s is 7 is effective in maintaining a large voltage holding ratio at room temperature and also at a temperature close to the maximum temperature of the nematic phase even after the device has been used for a long period of time because the compound (5) has a small volatility. A preferred ratio of the antioxidant is about 50 ppm or more for achieving the effect thereof, and about 600 ppm or less for avoiding a decrease in the maximum temperature or avoiding an increase in the minimum temperature. A further preferred ratio is in the range of about 100 ppm to about 300 ppm.

Preferred examples of the ultraviolet light absorber include a benzophenone derivative, a benzoate derivative and a triazole derivative. A light stabilizer such as an amine having steric hindrance is also preferred. A preferred ratio of the ultraviolet light absorber or the stabilizer is about 50 ppm or more for achieving the effect thereof, and about 10,000 ppm or less for avoiding a decrease in the maximum temperature or avoiding an increase in the minimum temperature. A further preferred ratio is in the range of about 100 ppm to about 10,000 ppm.

A dichroic dye such as an azo dye or an anthraquinone dye is mixed with the composition to be adapted for a device having a guest host (GH) mode. A preferred ratio of the dye is in the range of about 0.01% by weight to about 10% by weight.

The antifoaming agent such as dimethyl silicone oil or methyl phenyl silicone oil is mixed with the composition for preventing foam formation. A preferred ratio of the antifoaming agent is about 1 ppm or more for achieving the effect thereof, and about 1,000 ppm or less for avoiding a poor display. A further preferred ratio is in the range of about 1 ppm to about 500 ppm.

The polymerizable compound is mixed with the composition to be adapted for the device having the polymer sustained alignment (PSA) mode. Preferred examples of the polymerizable compound include a compound having a polymerizable group, such as an acrylate, a methacrylate, a vinyl compound, a vinyloxy compound, a propenyl ether, an epoxy compound (oxirane, oxetane) and a vinyl ketone. Particularly preferred examples include an acrylate derivative or a methacrylate derivative. A preferred ratio of the polymerizable compound is about 0.05% by weight or more for achieving the effect thereof, and about 10% by weight or less for avoiding a poor display. A further preferred ratio is in the range of about 0.1% by weight to about 2% by weight. The polymerizable compound is preferably polymerized by irradiation with ultraviolet light or the like in the presence of a suitable initiator such as a photopolymerization initiator. Suitable conditions for polymerization, suitable types of the initiator and suitable amounts thereof are known to those skilled in the art and are described in literatures. For example, Irgacure 651 (registered trademark), Irgacure 184 (registered trademark) or Darocure 1173 (registered trademark) (Ciba Japan K. K.), each being a photoinitiator, is suitable for radical polymerization. The polymerizable compound contains the photopolymerization initiator preferably in the range of about 0.1% by weight to about 5% by weight, particularly preferably, in the range of about 1% by weight to about 3% by weight. A polymerized compound may be arranged through a process of arranging the liquid crystal composition containing the polymerizable compound between two substrates in the liquid crystal display device and polymerizing the polymerizable compound while applying a voltage between opposing electrode layers on the substrates, or a liquid crystal composition containing a preliminarily polymerized compound may be arranged between the two substrates in the liquid crystal display device.

Seventh, the methods for synthesizing the component compounds will be explained. The compounds can be prepared according to known methods. Examples of synthetic methods will be shown. Compound (1-2) is prepared by the method described in JP S63-215653 A (1988). Compound (2-1-1) is prepared by the method described in JP 2000-053602 A (2000). Compound (3-1-1) and compound (3-5-1) are prepared by the method described in JP S59-176221 A (1984). The antioxidant is commercially available. A compound represented by formula (5) where s is 1 is available from Sigma-Aldrich Corporation. Compound (5) where s is 7 and so forth are prepared according to the method described in U.S. Pat. No. 3,660,505 B.

Any compounds whose synthetic methods are not described above can be prepared according to the methods described in books such as Organic Syntheses (John Wiley & Sons, Inc.), Organic Reactions (John Wiley & Sons, Inc.), Comprehensive Organic Synthesis (Pergamon Press) and New Experimental Chemistry Course (Shin Jikken Kagaku Koza in Japanese) (Maruzen Co., Ltd.). The composition is prepared according to publicly known methods using the thus obtained compounds. For example, the component compounds are mixed and dissolved in each other by heating.

Last, the application of the composition will be explained. Most of the compositions have a minimum temperature of about $-10°$ C. or lower, a maximum temperature of about 70° C. or higher, and an optical anisotropy in the range of about 0.07 to about 0.20. The device including the composition has a large voltage holding ratio. The composition is suitable for use in the AM device. The composition is particularly suitable for use in a transmissive AM device. The composition having an optical anisotropy in the range of about 0.08 to about 0.25 may be prepared by controlling the ratio of the component compounds or by mixing with any other liquid crystal compound. The composition can be used as the composition having the nematic phase and as the optically active composition by adding the optically active compound.

The composition can be used in the AM device. The composition can also be used in a PM device. The composition can also be used in an AM device and a PM device both having a mode such as PC, TN, STN, ECB, OCB, IPS, VA or PSA. Use for in the AM device having the PSA mode is particularly preferred. The devices may be of a reflective type, a transmissive type or a transflective type. Use for in the transmissive device is preferred. The composition can also be used in an amorphous silicon-TFT device or a polycrystal silicon-TFT device. The composition can also be used in a nematic curvilinear aligned phase (NCAP) device prepared by microencapsulating the composition, and in a polymer dispersed (PD) device in which a three-dimensional network polymer is formed in the composition.

The liquid crystal display device of the invention is characterized by comprising two substrates including the electrode layer on at least one of the substrates, and arranging between the two substrates the liquid crystal composition of the invention or the liquid crystal composition containing the compound formed by polymerizing the compound of the invention. For example, the liquid crystal display device comprises two glass substrates referred to as an array substrate and a color filter substrate, and a thin film transistor (TFT), pixels, a coloring layer and so forth are formed on each of the glass substrates. An aluminosilicate glass or aluminoborosilicate glass is used for the glass substrates, for example. For the electrode layer, Indium-Tin Oxide and Indium-Zinc Oxide are generally used.

EXAMPLES

In order to evaluate characteristics of a composition and a compound to be contained in the composition, the composition and the compound were made a measurement object. When the measurement object was the composition, the composition was measured as a sample as is, and values obtained were described. When the measurement object was the compound, a sample for measurement was prepared by mixing the compound (15% by weight) with mother liquid crystals (85% by weight). Values of characteristics of the compound were calculated using values obtained by measurement, according to an extrapolation method: (extrapolated value)={(measured value of a sample for measurement)−0.85×(measured value of mother liquid crystals)}/0.15. When a smectic phase (or crystals) precipitated at the above ratio at 25° C., a ratio of the compound to the mother liquid crystals was changed step by step in the order of (10% by weight:90% by weight), (5% by weight:95% by weight) and (1% by weight:99% by weight). Values of a maximum temperature, an optical anisotropy, viscosity and a dielectric anisotropy with regard to the compound were determined according to the extrapolation method.

Components of the mother liquid crystals and ratios thereof were as described below.

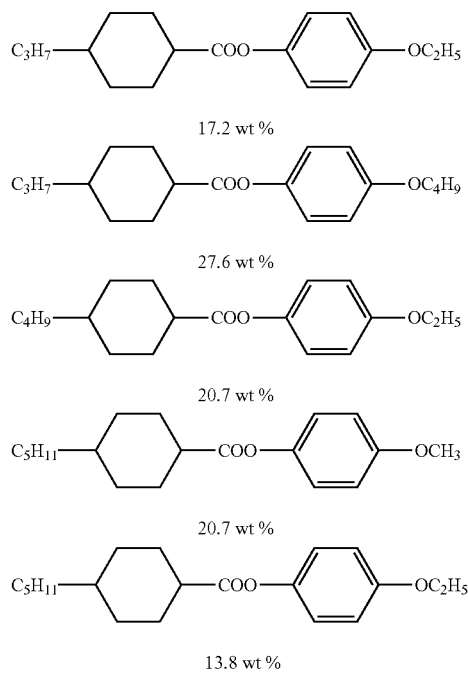

The characteristics were measured according to the methods described below. Most of the methods are applied as described in EIAJ ED-2521A of the Standard of Electronic Industries Association of Japan, or as modified thereon.

Maximum Temperature of a Nematic Phase (NI; ° C.):

A sample was placed on a hot plate in a melting point apparatus equipped with a polarizing microscope and was heated at a rate of 1° C. per minute. Temperature when a part of the sample began to change from a nematic phase to an isotropic liquid was measured. A higher limit of a temperature range of the nematic phase may be abbreviated as "maximum temperature."

Minimum Temperature of a Nematic Phase ($T_c$; ° C.):

A sample having a nematic phase was put in glass vials and kept in freezers at temperatures of 0° C., −10° C., −20° C., −30° C. and −40° C. for 10 days, and then liquid crystal phases were observed. For example, when the sample maintained the nematic phase at −20° C. and changed to crystals or a smectic phase at −30° C., $T_c$ was expressed as $T_c \leq -20°$ C. A lower limit of the temperature range of the nematic phase may be abbreviated as "minimum temperature."

Viscosity (Bulk Viscosity; η; Measured at 20° C.; mPa·s):

A cone-plate (E type) rotational viscometer was used for measurement.

Optical Anisotropy (Refractive Index Anisotropy; Δn; Measured at 25° C.):

Measurement was carried out by means of an Abbe refractometer with a polarizing plate mounted on an ocular, using light at a wavelength of 589 nanometers. A surface of a main prism was rubbed in one direction, and then a sample was added dropwise onto the main prism. A refractive index (n∥) was measured when the direction of polarized light was parallel to the direction of rubbing. A refractive index (n⊥) was measured when the direction of polarized light was perpendicular to the direction of rubbing. A value of optical anisotropy was calculated from an equation: Δn=n∥−n⊥.

Dielectric Anisotropy (Δ∈; Measured at 25° C.):

A value of dielectric anisotropy was calculated from an equation: Δ∈=∈∥−∈⊥. A dielectric constant (∈∥ and ∈⊥) was measured as described below.

(1) Measurement of dielectric constant (∈∥): An ethanol (20 mL) solution of octadecyl triethoxysilane (0.16 mL) was applied to a well-washed glass substrate. After rotating the glass substrate with a spinner, the glass substrate was heated at 150° C. for 1 hour. A sample was put in a VA device in which a distance (cell gap) between two glass substrates was 4 micrometers, and the device was sealed with an ultraviolet-curable adhesive. Sine waves (0.5 V, 1 kHz) were applied to the device, and after 2 seconds, a dielectric constant (∈∥) in the major axis direction of liquid crystal molecules was measured.

(2) Measurement of dielectric constant (∈⊥): A polyimide solution was applied to a well-washed glass substrate. After calcining the glass substrate, rubbing treatment was applied to the alignment film obtained. A sample was put in a TN device in which a distance (cell gap) between two glass substrates was 9 micrometers and a twist angle was 80 degrees. Sine waves (0.5 V, 1 kHz) were applied to the device, and after 2 seconds, a dielectric constant (∈⊥) in the minor axis direction of the liquid crystal molecules was measured.

Threshold Voltage (Vth; Measured at 25° C.; V):

An LCD-5100 luminance meter made by Otsuka Electronics Co., Ltd. was used for measurement. A light source was a halogen lamp. A sample was put in a normally black mode VA device in which a distance (cell gap) between two glass substrates was 4 micrometers and a rubbing direction was anti-parallel, and the device was sealed with an ultraviolet-curable adhesive. A voltage (60 Hz, rectangular waves) to be applied to the device was stepwise increased from 0 V to 20 V at an increment of 0.02 V. On the occasion, the device was irradiated with light from a direction perpendicular to the device, and the amount of light transmitting the device was measured. A voltage-transmittance curve was prepared, in which the maximum amount of light corresponds to 100% transmittance and the minimum amount of light corresponds to 0% transmittance. A threshold voltage is a voltage at 10% transmittance.

Voltage Holding Ratio (VHR-1; at 25° C.; %):

A TN device used for measurement had a polyimide alignment film, and a distance (cell gap) between two glass substrates was 5 micrometers. A sample was put in the device, and then the device was sealed with an ultraviolet-curable adhesive. A pulse voltage (60 microseconds at 5 V) was applied to the TN device and the device was charged. A decaying voltage was measured for 16.7 milliseconds with a high-speed voltmeter, and area A between a voltage curve and a horizontal axis in a unit cycle was determined. Area B is an area without decay. A voltage holding ratio is a percentage of area A to area B.

Voltage Holding Ratio (VHR-2; at 80° C.; %):

A TN device used for measurement had a polyimide alignment film, and a distance (cell gap) between two glass substrates was 5 micrometers. A sample was put in the device, and then the device was sealed with an ultraviolet-curable adhesive. A pulse voltage (60 microseconds at 5 V) was applied to the TN device and the device was charged. A decaying voltage was measured for 16.7 milliseconds with a high-speed voltmeter, and area A between a voltage curve and a horizontal axis in a unit cycle was determined. Area B is an area without decay. A voltage holding ratio is a percentage of area A to area B.

Voltage Holding Ratio (VHR-3; at 25° C.; %):

Stability to ultraviolet light was evaluated by measuring a voltage holding ratio after a device was irradiated with ultraviolet light. A TN device used for measurement had a polyimide alignment film, and a cell gap was 5 micrometers. A sample was injected into the device, and then the device was irradiated with light for 20 minutes. A light source was an ultra high-pressure mercury lamp USH-500D (made by Ushio, Inc.), and a distance between the device and the light source was 20 centimeters. In measuring VHR-3, a decaying voltage was measured for 16.7 milliseconds. A composition having a large VHR-3 has a large stability to ultraviolet light. A value of VHR-3 is preferably 90% or more, further preferably, 95% or more.

Voltage Holding Ratio (VHR-4; at 25° C.; %):

A TN device into which a sample was injected was heated in a constant-temperature bath at 80° C. for 500 hours, and then stability to heat was evaluated by measuring a voltage holding ratio. In measuring VHR-4, a decaying voltage was measured for 16.7 milliseconds. A composition having a large VHR-4 has a large stability to heat.

Response Time ($\tau$; measured at 25° C.; ms): An LCD-5100 luminance meter made by Otsuka Electronics Co., Ltd. was used for measurement. A light source was a halogen lamp. A low-pass filter was set at 5 kHz. A sample was put in a normally black mode PVA device in which a distance (cell gap) between two glass substrates was 3.2 micrometers and a rubbing direction was anti-parallel, and the device was sealed with an ultraviolet-curable adhesive. A voltage a little over a threshold voltage was applied to the device for about 1 minute, and then the device was irradiated with ultraviolet light of 23.5 mW/cm$^2$ for about 8 minutes while applying a voltage of 5.6 V to the device. Rectangular waves (60 Hz, 10 V, 0.5 second) were applied to the device. On the occasion, the device was irradiated with light from a direction perpendicular to the device, and the amount of light transmitting the device was measured. The maximum amount of light corresponds to 100% transmittance, and the minimum amount of light corresponds to 0% transmittance. A response time is a period of time needed for a change from 0% transmittance to 90% transmittance (rise time; millisecond).

Specific Resistance ($\rho$; Measured at 25° C.; $\Omega$cm):

Into a vessel equipped with electrodes, 1.0 milliliter of a sample was injected. A DC voltage (10 V) was applied to the vessel, and a DC current after 10 seconds was measured. A specific resistance was calculated from the following equation: (specific resistance)={(voltage)×(electric capacity of a vessel)}/{(direct current)×(dielectric constant of vacuum)}.

Gas Chromatographic Analysis:

GC-14B Gas Chromatograph made by Shimadzu Corporation was used for measurement. A carrier gas was helium (2 mL per minute). A sample injector and a detector (FID) were set to 280° C. and 300° C., respectively. A capillary column DB-1 (length 30 m, bore 0.32 mm, film thickness 0.25 µm; dimethylpolysiloxane as a stationary phase, non-polar) made by Agilent Technologies, Inc. was used for separation of component compounds. After the column was kept at 200° C. for 2 minutes, the column was heated to 280° C. at a rate of 5° C. per minute. A sample was prepared in an acetone solution (0.1% by weight), and then 1 microliter of the solution was injected into the sample injector. A recorder was C-R5A Chromatopac made by Shimadzu Corporation or the equivalent thereof. The resulting chromatogram showed a retention time of a peak and a peak area corresponding to each of the component compounds.

As a solvent for diluting the sample, chloroform, hexane and so forth may also be used. The following capillary columns may also be used for separating the component compounds: HP-1 (length 30 m, bore 0.32 mm, film thickness 0.25 µm) made by Agilent Technologies, Inc., Rtx-1 (length 30 m, bore 0.32 mm, film thickness 0.25 µm) made by Restek Corporation and BP-1 (length 30 m, bore 0.32 mm, film thickness 0.25 µm) made by SGE International Pty. Ltd. A capillary column CBP1-M50-025 (length 50 m, bore 0.25 mm, film thickness 0.25 µm) made by Shimadzu Corporation may also be used for the purpose of avoiding an overlap of peaks of the compounds.

A ratio of liquid crystal compounds contained in the composition may be calculated by the method as described below. The liquid crystal compounds can be detected by means of a gas chromatograph. A ratio of peak areas in the gas chromatogram corresponds to a ratio (in the number of moles) of liquid crystal compounds. When the capillary columns described above were used, a correction coefficient of each liquid crystal compound may be regarded as 1 (one). Accordingly, a ratio (% by weight) of liquid crystal compounds was calculated from the ratio of peak areas.

The invention will be explained in detail by way of Examples. The invention is not limited by the Examples described below. The compounds in Comparative Examples and Examples were described using symbols according to definitions in Table 3 below. In Table 3, a configuration of 1,4-cyclohexylene is trans. A parenthesized number next to a symbolized compound in Comparative examples and Examples corresponds to the number of the compound. A symbol (–) means any other liquid crystal compound. A ratio (percentage) of the liquid crystal compounds is expressed in terms of weight percent (% by weight) based on the weight of the liquid crystal composition excluding the first composition. The liquid crystal composition further includes an impurity in addition thereto. Last, values of characteristics of the composition were summarized.

TABLE 3

| Method for Description of Compounds using Symbols R—(A$_1$)—Z$_1$- - - -Z$_n$—(A$_n$)—R' | |
|---|---|
| 1) Left-terminal Group R— | Symbol |
| C$_n$H$_{2n+1}$— | n— |
| C$_n$H$_{2n+1}$O— | nO— |
| C$_m$H$_{2m+1}$OC$_n$H$_{2n}$— | mOn— |
| CH$_2$=CH— | V— |
| C$_n$H$_{2n+1}$—CH=CH— | nV— |
| CH$_2$=CH—C$_n$H$_{2n}$— | Vn— |
| C$_m$H$_{2m+1}$—CH=CH—C$_n$H$_{2n}$— | mVn— |

TABLE 3-continued

| | |
|---|---|
| CF$_2$=CH— | VFF— |
| CF$_2$=CH—C$_n$H$_{2n}$— | VFFn— |
| CH$_2$=CHCOO— | AC— |
| CH$_2$=C(CH$_3$)COO— | MAC— |

| 2) Right-terminal Group — | Symbol |
|---|---|
| —C$_n$H$_{2n+1}$ | —n |
| —OC$_n$H$_{2n+1}$ | —On |
| —CH=CH$_2$ | —V |
| —CH=CH—C$_n$H$_{2n+1}$ | —Vn |
| —C$_n$H$_{2n}$—CH=CH$_2$ | —nV |
| —CH=CF$_2$ | —VFF |
| —COOCH$_3$ | —EMe |
| —OCOCH=CH$_2$ | —AC |
| —OCOC(CH$_3$)=CH$_2$ | —MAC |

| 3) Bonding Group —Z$_n$— | Symbol |
|---|---|
| —C$_2$H$_4$— | 2 |
| —COO— | E |
| —CH=CH— | V |
| —C≡C— | T |
| —CF$_2$O— | X |
| —CH$_2$O— | 1O |
| —SiH$_2$— | Si |

| 4) Ring Structure —A$_n$— | Symbol |
|---|---|
| 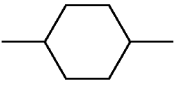 | H |
| 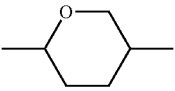 | Dh |
|  | B |
| 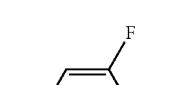 | B(F) |
| 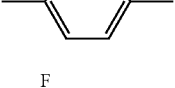 | B(2F) |
|  | B(2F, 5F) |
| 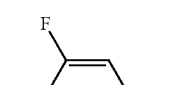 | B(2F, 3F) |
| 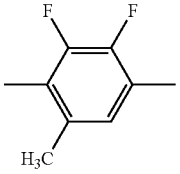 | B(2F, 3F, 6Me) |
| 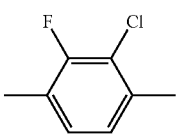 | B(2F, 3CL) |
| 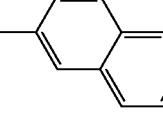 | Np |
| 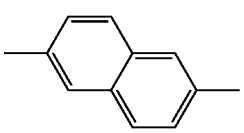 | Cro(7F, 8F) |
| 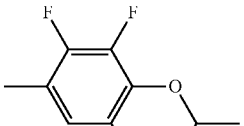 | [HH-1] |
|  | [H] |

5) Examples of Description

Example 1 3-HB(2F, 3F)-O2

TABLE 3-continued

Example 2 MAC-B-[HH-5]-B-MAC

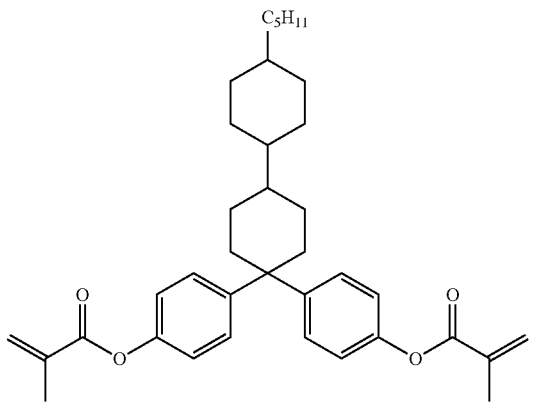

Comparative Example 1

Components of liquid crystal composition A and ratios thereof were as described below.

| | | |
|---|---|---|
| 3-H2B(2F,3F)-O2 | (2-2-1) | 18% |
| 5-H2B(2F,3F)-O2 | (2-2-1) | 17% |
| 3-HH1OCro(7F,8F)-5 | (2-22-1) | 6% |
| 3-HBB(2F,3F)-O2 | (2-5-1) | 10% |
| 4-HBB(2F,3F)-O2 | (2-5-1) | 6% |
| 5-HBB(2F,3F)-O2 | (2-5-1) | 6% |
| 2-HH-3 | (3-1-1) | 14% |
| 3-HH-4 | (3-1-1) | 8% |
| 3-HHB-1 | (3-5-1) | 5% |
| 3-HHB-3 | (3-5-1) | 6% |
| 3-HHB-O1 | (3-5-1) | 4% |

When 0.5 part by weight of compound (R-1) having biphenyl as a ring structure as described below was added to 100 parts by weight of liquid crystal composition A and dissolution of the compound was attempted by carrying out stirring at 25° C. for 3 hours, the compound was dissolved. Characteristics of the composition were as described below.

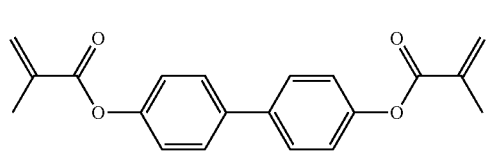

(R-1)

NI=78.8° C.; Tc≤−20° C.; Δn=0.092; Δ∈=−3.5; Vth=2.04 V; τ=5.3 ms; VHR-1=99.2%; VHR-2=97.9%.

Moreover, when 1 part by weight of compound (R-1) described above was added to 100 parts by weight of liquid crystal composition A and dissolution of the compound was attempted by carrying out stirring at 25° C. for 3 hours, crystals could be visually confirmed in the composition and the mixture was not applicable as a liquid crystal composition.

Comparative Example 2

The composition is a liquid crystal composition without containing a first component of the invention. Components and characteristics of the composition were as described below.

| | | |
|---|---|---|
| 3-H2B(2F,3F)-O2 | (2-2-1) | 20% |
| 5-H2B(2F,3F)-O2 | (2-2-1) | 15% |
| 3-HBB(2F,3F)-O2 | (2-5-1) | 10% |
| 4-HBB(2F,3F)-O2 | (2-5-1) | 7% |
| 5-HBB(2F,3F)-O2 | (2-5-1) | 5% |
| 3-HH1OCro(7F,8F)-5 | (2-22-1) | 7% |
| 2-HH-3 | (3-1-1) | 24% |
| 3-HH-4 | (3-1-1) | 3% |
| 3-HHB-O1 | (3-5-1) | 3% |
| 3-HHEBH-3 | (3-10-1) | 3% |
| 3-HHEBH-4 | (3-10-1) | 3% |

NI=78.3° C.; Tc≤−20° C.; Δn=0.090; Δ∈=−3.8; Vth=1.90 V; τ=6.8 ms; VHR-1=99.2%; VHR-2=98.1%.

Example 1

| | | |
|---|---|---|
| 3-H2B(2F,3F)-O2 | (2-2-1) | 18% |
| 5-H2B(2F,3F)-O2 | (2-2-1) | 17% |
| 3-HH1OCro(7F,8F)-5 | (2-22-1) | 6% |
| 3-HBB(2F,3F)-O2 | (2-5-1) | 10% |
| 4-HBB(2F,3F)-O2 | (2-5-1) | 6% |
| 5-HBB(2F,3F)-O2 | (2-5-1) | 6% |
| 2-HH-3 | (3-1-1) | 14% |
| 3-HH-4 | (3-1-1) | 8% |
| 3-HHB-1 | (3-5-1) | 5% |
| 3-HHB-3 | (3-5-1) | 6% |
| 3-HHB-O1 | (3-5-1) | 4% |

When 0.5 part by weight of compound (1-1) described below was added to 100 parts by weight of the liquid crystal composition and dissolution of the compound was attempted by carrying out stirring at 25° C. for 3 hours, the compound was dissolved. Characteristics of the composition were as described below.

MAC-B-[HH-5]-B-MAC    (1-1)

NI=78.5° C.; Tc≤−20° C.; Δn=0.092; Δ∈=−3.5; Vth=2.04 V; τ=4.8 ms; VHR-1=99.1%; VHR-2=98.0%.

Moreover, even when 1 part by weight of compound (1-1) described above was added to 100 parts by weight of composition A described above and dissolution was attempted by carrying out stirring at 25° C. for 3 hours, crystals were completely dissolved. Characteristics of the composition were as described below.

NI=78.7° C.; Tc≤−20° C.; Δn=0.092; Δ∈=−3.5; Vth=2.03 V; τ=4.6 ms; VHR-1=99.1%; VHR-2=98.0%.

Example 2

| | | |
|---|---|---|
| 3-H2B(2F,3F)-O2 | (2-2-1) | 20% |
| 5-H2B(2F,3F)-O2 | (2-2-1) | 15% |
| 3-HBB(2F,3F)-O2 | (2-5-1) | 10% |
| 4-HBB(2F,3F)-O2 | (2-5-1) | 7% |
| 5-HBB(2F,3F)-O2 | (2-5-1) | 5% |
| 3-HH1OCro(7F,8F)-5 | (2-22-1) | 7% |
| 2-HH-3 | (3-1-1) | 24% |

-continued

| | | |
|---|---|---|
| 3-HH-4 | (3-1-1) | 3% |
| 3-HHB-O1 | (3-5-1) | 3% |
| 3-HHEBH-3 | (3-10-1) | 3% |
| 3-HHEBH-4 | (3-10-1) | 3% |

To 100 parts by weight of the composition, 0.3 part by weight of compound (1-1) described below was added.

MAC-B-[HH-5]-B-MAC  (1-1)

NI=78.7° C.; Tc≤−20° C.; Δn=0.091; Δ∈=−3.8; Vth=1.91 V; τ=4.9 ms; VHR-1=99.2%; VHR-2=98.1%.

Example 3

| | | |
|---|---|---|
| 3-H2B(2F,3F)-O2 | (2-2-1) | 20% |
| 5-H2B(2F,3F)-O2 | (2-2-1) | 15% |
| 3-HBB(2F,3F)-O2 | (2-5-1) | 10% |
| 4-HBB(2F,3F)-O2 | (2-5-1) | 7% |
| 5-HBB(2F,3F)-O2 | (2-5-1) | 5% |
| 3-HH1OCro(7F,8F)-5 | (2-22-1) | 7% |
| 2-HH-3 | (3-1-1) | 24% |
| 3-HH-4 | (3-1-1) | 3% |
| 3-HHB-O1 | (3-5-1) | 3% |
| 3-HHEBH-3 | (3-10-1) | 3% |
| 3-HHEBH-4 | (3-10-1) | 3% |

To 100 parts by weight of the composition, 0.3 part by weight of compound (1-2) described below was added.

MAC-B-[H]-B-MAC  (1-2)

NI=78.6° C.; Tc≤−20° C.; Δn=0.091; Δ∈=−3.8; Vth=1.90 V; τ=4.6 ms; VHR-1=99.2%; VHR-2=98.1%.

Example 4

| | | |
|---|---|---|
| V-HB(2F,3F)-O2 | (2-1-1) | 15% |
| V-HB(2F,3F)-O4 | (2-1-1) | 15% |
| 3-HBB(2F,3F)-O2 | (2-5-1) | 10% |
| 4-HBB(2F,3F)-O2 | (2-5-1) | 8% |
| 5-HBB(2F,3F)-O2 | (2-5-1) | 5% |
| 3-HHB(2F,3CL)-O2 | (2-6-1) | 3% |
| 4-HHB(2F,3CL)-O2 | (2-6-1) | 3% |
| 3-HH-4 | (3-1-1) | 5% |
| V-HH-3 | (3-1-1) | 20% |
| 3-HHB-1 | (3-5-1) | 4% |
| 3-B(F)BB-2 | (3-8-1) | 6% |
| 3-HHEBH-3 | (3-10-1) | 3% |
| 3-HHEBH-4 | (3-10-1) | 3% |

To 100 parts by weight of the composition, 0.2 part by weight of compound (1-2) described below was added.

MAC-B-[H]-B-MAC  (1-2)

NI=76.8° C.; Tc≤−20° C.; Δn=0.104; Δ∈=−3.1; Vth=2.13 V; τ=5.0 ms; VHR-1=99.1%; VHR-2=97.9%.

Example 5

| | | |
|---|---|---|
| 3-HB(2F,3F)-O2 | (2-1-1) | 10% |
| 3-H2B(2F,3F)-O2 | (2-2-1) | 10% |
| 5-H2B(2F,3F)-O2 | (2-2-1) | 10% |
| 3-HHB(2F,3F)-O2 | (2-3-1) | 10% |
| 5-HHB(2F,3F)-O2 | (2-3-1) | 8% |
| 2-BB(2F,3F)B-3 | (2-9-1) | 7% |
| 2-BB(2F,3F)B-4 | (2-9-1) | 6% |
| 2-HH-3 | (3-1-1) | 13% |
| 3-HH-O1 | (3-1-1) | 5% |
| VFF-HH-3 | (3-1) | 5% |
| 3-HHB-3 | (3-5-1) | 3% |
| 3-HBB-2 | (3-6-1) | 6% |
| 5-HBB(F)B-2 | (3-13-1) | 7% |

To 100 parts by weight of the composition, 0.3 part by weight of compound (1-1) described below was added.

MAC-B-[HH-5]-B-MAC  (1-1)

NI=81.2° C.; Tc≤−20° C.; Δn=0.115; Δ∈=−2.6; Vth=2.34 V; τ=4.4 ms; VHR-1=99.2%; VHR-2=98.3%.

Example 6

| | | |
|---|---|---|
| 3-HB(2F,3F)-O2 | (2-1-1) | 12% |
| 3-HB(2F,3F)-O4 | (2-1-1) | 12% |
| 3-HBB(2F,3F)-O2 | (2-5-1) | 8% |
| 2-HdhB(2F,3F)-O2 | (2-13-1) | 7% |
| 2-HH-3 | (3-1-1) | 18% |
| 1V-HH-3 | (3-1-1) | 8% |
| 3-HB-O2 | (3-2-1) | 8% |
| V2-BB-1 | (3-3-1) | 5% |
| 3-HHEH-3 | (3-4-1) | 3% |
| 3-HHEH-4 | (3-4-1) | 3% |
| V2-HHB-1 | (3-5-1) | 6% |
| 5-HBB(F)B-2 | (3-13-1) | 5% |
| 5-HBB(F)B-3 | (3-13-1) | 5% |

To 100 parts by weight of the composition, 0.4 part by weight of compound (1-1) described below was added.

MAC-B-[HH-5]-B-MAC  (1-1)

NI=77.5° C.; Tc≤−20° C.; Δn=0.101; Δ∈=−2.3; Vth=2.33 V; τ=3.6 ms; VHR-1=99.2%; VHR-2=98.4%.

Example 7

| | | |
|---|---|---|
| V-HB(2F,3F)-O2 | (2-1-1) | 10% |
| V-HB(2F,3F)-O4 | (2-1-1) | 10% |
| 3-HHB(2F,3F)-O2 | (2-3-1) | 10% |
| 3-HBB(2F,3CL)-O2 | (2-7-1) | 8% |
| 2O-B(2F,3F)B(2F,3F)-O6 | (2-8) | 3% |
| 4O-B(2F,3F)B(2F,3F)-O6 | (2-8) | 3% |
| 2-HH-3 | (3-1-1) | 8% |
| V-HH-3 | (3-1-1) | 30% |
| 2-BB(F)B-3 | (3-7-1) | 5% |
| 3-HB(F)HH-5 | (3-9-1) | 4% |
| 3-HHEBH-3 | (3-10-1) | 4% |
| 5-HBB(F)B-3 | (3-13-1) | 5% |

To 100 parts by weight of the composition, 0.3 part by weight of compound (1-2) described below was added.

MAC-B-[H]-B-MAC  (1-2)

NI=75.0° C.; Tc≤−20° C.; Δn=0.097; Δ∈=−2.5; Vth=2.28 V; τ=4.2 ms; VHR-1=99.1%; VHR-2=98.0%.

Example 8

| | | |
|---|---|---|
| 3-HB(2F,3F)-O2 | (2-1-1) | 8% |
| 3-HB(2F,3F)-O4 | (2-1-1) | 8% |
| 3-HHB(2F,3F)-O2 | (2-3-1) | 8% |
| 5-HHB(2F,3F)-O2 | (2-3-1) | 6% |
| 3-HHB(2F,3CL)-O2 | (2-6-1) | 3% |
| 2-BB(2F,3F)B-4 | (2-9-1) | 6% |
| 3-HEB(2F,3F)B(2F,3F)-O2 | (2-16-1) | 5% |
| 3-HEB(2F,3F)B(2F,3F)-O4 | (2-16-1) | 5% |
| 3-HH1OB(2F,3F,6Me)-O2 | (2-18-1) | 5% |
| 3-H1O-B(2F,3F,6Me)-O2 | (2) | 3% |
| 2-HH-3 | (3-1-1) | 17% |
| 7-HB-1 | (3-2-1) | 6% |
| 1V2-BB-1 | (3-3-1) | 3% |
| V-HHB-1 | (3-5-1) | 10% |
| 1-BB(F)B-2V | (3-7-1) | 4% |
| 3-HB(F)BH-3 | (3-12-1) | 3% |

To 100 parts by weight of the composition, 0.4 part by weight of compound (1-1) described below was added.

MAC-B-[HH-5]-B-MAC   (1-1)

NI=85.3° C.; Tc≤−20° C.; Δn=0.112; Δ∈=−2.9; Vth=2.34 V; τ=5.6 ms; VHR-1=99.1%; VHR-2=98.1%.

Example 9

| | | |
|---|---|---|
| V-HB(2F,3F)-O2 | (2-1-1) | 10% |
| V-HB(2F,3F)-O4 | (2-1-1) | 5% |
| 3-HH2B(2F,3F)-O2 | (2-4-1) | 10% |
| 5-HH2B(2F,3F)-O2 | (2-4-1) | 6% |
| 2-H1OB(2F,3F)-O2 | (2-10-1) | 7% |
| 3-DhHB(2F,3F)-O2 | (2-12-1) | 5% |
| 3-HDhB(2F,3F)-O2 | (2-13-1) | 5% |
| 3-dhBB(2F,3F)-O2 | (2-15-1) | 5% |
| 3-HH-4 | (3-1-1) | 13% |
| V-HH-4 | (3-1-1) | 9% |
| 5-HB-O2 | (3-2-1) | 6% |
| 1V-HBB-2 | (3-6-1) | 5% |
| 2-BB(F)B-5 | (3-7-1) | 8% |
| 5-HBBH-3 | (3-11-1) | 3% |
| 3-HH1OH-3 | (3) | 3% |

To 100 parts by weight of the composition, 0.8 part by weight of compound (1-1) described below was added.

MAC-B-[HH-5]-B-MAC   (1-1)

NI=82.2° C.; Tc≤−20° C.; Δn=0.103; Δ∈=−3.2; Vth=2.23 V; τ=5.1 ms; VHR-1=99.3%; VHR-2=98.3%.

Example 10

| | | |
|---|---|---|
| 3-H2B(2F,3F)-O2 | (2-2-1) | 20% |
| 5-H2B(2F,3F)-O2 | (2-2-1) | 15% |
| 3-HBB(2F,3F)-O2 | (2-5-1) | 10% |
| 5-HBB(2F,3F)-O2 | (2-5-1) | 8% |
| 5-HDhB(2F,3F)-O2 | (2-13-1) | 5% |
| 3-HH1OCro(7F,8F)-5 | (2-22-1) | 7% |
| 2-HH-3 | (3-1-1) | 20% |
| 3-HH-4 | (3-1-1) | 6% |
| 3-HHB-1 | (3-5-1) | 3% |
| 3-HHB-3 | (3-5-1) | 3% |
| 3-HHEBH-3 | (3-10-1) | 3% |

To 100 parts by weight of the composition, 0.5 part by weight of compound (1-1) described below was added.

MAC-B-[HH-5]-B-MAC   (1-1)

NI=75.6° C.; Tc≤−20° C.; Δn=0.090; Δ∈=−3.9; Vth=1.81 V; τ=4.9 ms; VHR-1=99.1%; VHR-2=98.2%.

Example 11

| | | |
|---|---|---|
| 1V2-HB(2F,3F)-O2 | (2-1-1) | 6% |
| 3-H2B(2F,3F)-O2 | (2-2-1) | 12% |
| 5-H2B(2F,3F)-O2 | (2-2-1) | 8% |
| 1V2-H2B(2F,3F)-O2 | (2-2-1) | 5% |
| 1V2-HH2B(2F,3F)-O2 | (2-4-1) | 4% |
| V-HBB(2F,3F)-O2 | (2-5-1) | 4% |
| 3-B(2F,3F)B(2F,3F)-O2 | (2-8-1) | 3% |
| 5-HH1OB(2F,3F)-O2 | (2-11-1) | 3% |
| 3-DhH1OB(2F,3F)-O2 | (2-14-1) | 3% |
| V-DhH1OB(2F,3F)-O2 | (2-14-1) | 3% |
| 3-HH2B(2F,3F,6Me)-O2 | (2-17-1) | 5% |
| 3-H1OCro(7F,8F)-5 | (2-20-1) | 4% |
| V-HH-5 | (3-1-1) | 13% |
| 1V-HH-4 | (3-1-1) | 3% |
| V2-HB-1 | (3-2-1) | 5% |
| 3-HHB-1 | (3-5-1) | 4% |
| 3-HHB-O1 | (3-5-1) | 3% |
| V2-BB(F)B-1 | (3-7-1) | 4% |
| 5-B(F)BB-2 | (3-8-1) | 5% |
| 1O1-HBBH-4 | (—) | 3% |

Into 100 parts by weight of the composition, 0.3 part by weight of compound (1-2) described below was added.

MAC-B-[H]-B-MAC   (1-2)

NI=75.0° C.; Tc≤−20° C.; Δn=0.104; Δ∈=−3.8; Vth=1.83 V; τ=5.8 ms; VHR-1=99.2%; VHR-2=98.2%.

Example 12

| | | |
|---|---|---|
| 3-H2B(2F,3F)-O2 | (2-2-1) | 16% |
| 5-H2B(2F,3F)-O2 | (2-2-1) | 15% |
| 3-HHB(2F,3F)-O2 | (2-3-1) | 10% |
| 5-HHB(2F,3F)-O2 | (2-3-1) | 5% |
| 3-HBB(2F,3F)-O2 | (2-5-1) | 8% |
| 4-HBB(2F,3F)-O2 | (2-5-1) | 5% |
| 5-HBB(2F,3F)-O2 | (2-5-1) | 5% |
| 3-HDhB(2F,3F)-O2 | (2-13-1) | 6% |
| 2-HH-3 | (3-1-1) | 15% |
| 3-HH-4 | (3-1-1) | 12% |
| 3-HHB-1 | (3-5-1) | 3% |

To 100 parts by weight of the composition, 0.4 part by weight of compound (1-1) described below was added.

MAC-B-[HH-5]-B-MAC   (1-1)

NI=79.6° C.; Tc≤−20° C.; Δn=0.091; Δ∈=−3.9; Vth=1.95 V; τ=4.5 ms; VHR-1=99.3%; VHR-2=98.4%.

Example 13

| | | |
|---|---|---|
| 3-H2B(2F,3F)-O2 | (2-2-1) | 16% |
| 5-H2B(2F,3F)-O2 | (2-2-1) | 15% |
| 3-HHB(2F,3F)-O2 | (2-3-1) | 10% |
| 5-HHB(2F,3F)-O2 | (2-3-1) | 5% |
| 3-HBB(2F,3F)-O2 | (2-5-1) | 8% |
| 4-HBB(2F,3F)-O2 | (2-5-1) | 5% |
| 5-HBB(2F,3F)-O2 | (2-5-1) | 5% |
| 3-HDhB(2F,3F)-O2 | (2-13-1) | 6% |
| 2-HH-3 | (3-1-1) | 15% |
| 3-HH-4 | (3-1-1) | 12% |
| 3-HHB-1 | (3-5-1) | 3% |

To 100 parts by weight of the composition, 0.4 part by weight of compound (1-2) described below was added.

MAC-B-[H]-B-MAC    (1-2)

NI=79.5° C.; Tc≤−20° C.; Δn=0.090; Δ∈=−3.9; Vth=1.93 V; τ=4.3 ms; VHR-1=99.3%; VHR-2=98.4%.

The compound according to Example 1 has a higher solubility in the liquid crystal composition in comparison with the compound according to Comparative Example 1. Moreover, the compositions according to Examples 2 to 13 have a shorter response time in comparison with the composition according to Comparative Example 2.

INDUSTRIAL APPLICABILITY

The invention provides a liquid crystal composition satisfying at least one of characteristics such as a high maximum temperature of a nematic phase, a low minimum temperature of the nematic phase, a small viscosity, a suitable optical anisotropy, a large negative dielectric anisotropy, a large specific resistance, a high stability to ultraviolet light and a high stability to heat, or a liquid crystal composition having a suitable balance regarding at least two of the characteristics. A liquid crystal display device including such a composition is applied to constitute an AM device having a short response time, a large voltage holding ratio, a large contrast ratio, a long service life and so forth, and thus can be used in a liquid crystal projector, a liquid crystal television and so forth.

What is claimed is:

1. A liquid crystal composition containing at least one compound selected from the group of compounds represented by formula (1) as a first component:

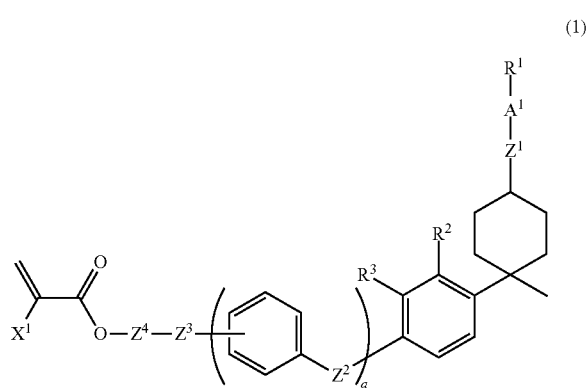

(1)

-continued

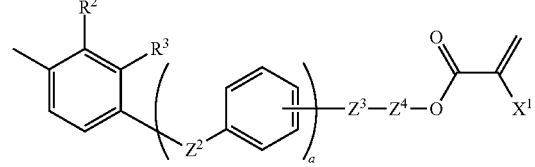

wherein $R^1$ is hydrogen or alkyl having 1 to 20 carbons, and in the alkyl, arbitrary —$CH_2$— may be replaced by —O—, —CH=CH— or —C≡C—, $R^2$ and $R^3$ are hydrogen or methyl; $A^1$ is a single bond, 1,4-phenylene or 1,4-cyclohexylene; $Z^1$ is a single bond or alkylene having 1 to 3 carbons; $Z^2$ is —O— or alkylene having 1 to 6 carbons; $Z^3$ is a single bond or —O—; $Z^4$ is a single bond or alkylene having 2 to 20 carbons, and in the alkylene, arbitrary —$CH_2$— may be replaced by —O—; $X^1$ is hydrogen, halogen, alkyl having 1 to 3 carbons or fluoroalkyl having 1 to 3 carbons; a is 0 or 1; and in the formula, arbitrary hydrogen on an arbitrary phenylene ring may be replaced by methyl, cyclohexyl or halogen.

2. The liquid crystal composition according to claim 1, wherein $A^1$ is a single bond or 1,4-cyclohexylene, a is 0 and $X^1$ is hydrogen or alkyl having 1 to 3 carbons.

3. The liquid crystal composition according to claim 1, wherein a ratio of the first component is in the range of 0.05 part by weight to 10 parts by weight based on 100 parts by weight of a liquid crystal composition excluding the first component.

4. The liquid crystal composition according to claim 1, further containing at least one compound selected from the group of compounds represented by formula (2) as a second component:

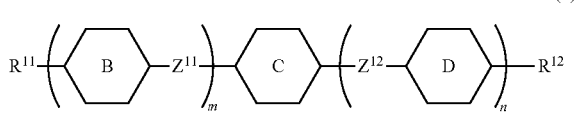

(2)

wherein $R^{11}$ and $R^{12}$ are independently alkyl having 1 to 12 carbons, alkoxy having 1 to 12 carbons or alkenyl having 2 to 12 carbons, or alkenyl having 2 to 12 carbons in which arbitrary hydrogen is replaced by fluorine; ring B and ring D are independently 1,4-cyclohexylene, 1,4-phenylene, 1,4-phenylene in which arbitrary hydrogen is replaced by fluorine or chlorine, or tetrahydropyran-2,5-diyl; ring C is 2,3-difluoro-1,4-phenylene, 2-chloro-3-fluoro-1,4-phenylene, 2,3-difluoro-5-methyl-1,4-phenylene, 3,4,5-trifluoronaphthalene-2,6-diyl or 7,8-difluorochroman-2,6-diyl; $Z^{11}$ and $Z^{12}$ are independently a single bond, ethylene, methyleneoxy or carbonyloxy; and m is 1, 2 or 3, n is 0 or 1, and a sum of m and n is 3 or less.

5. The liquid crystal composition according to claim 4, wherein the second component is at least one compound selected from the group of compounds represented by formula (2-1) to formula (2-23):

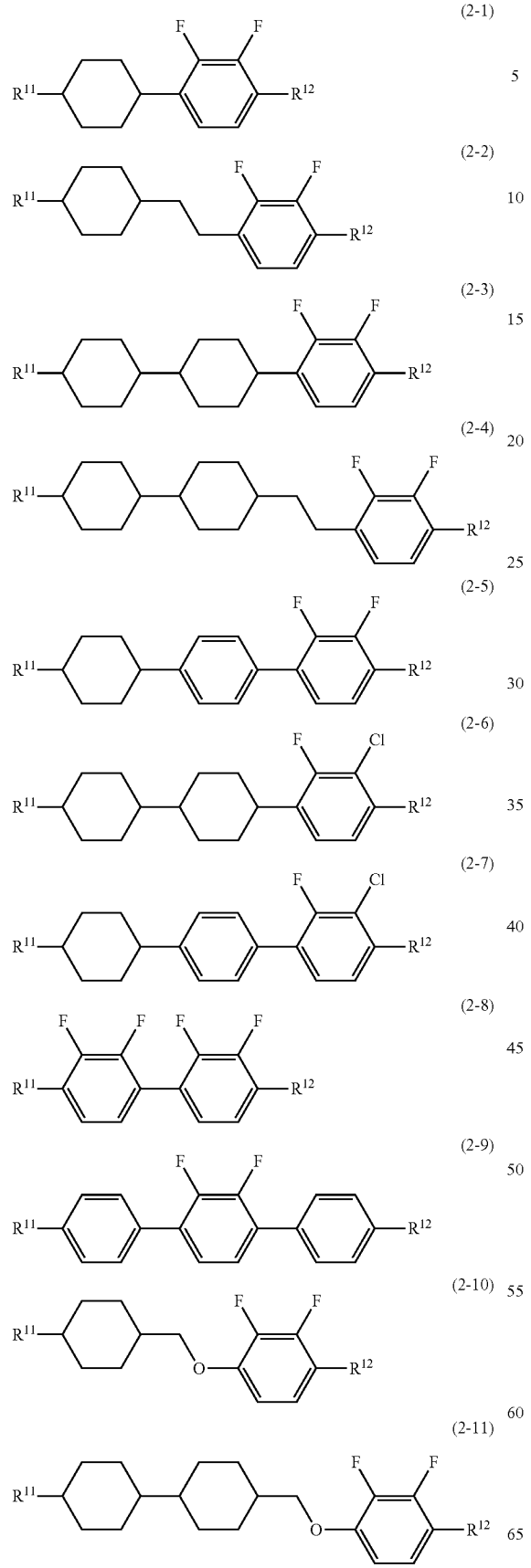
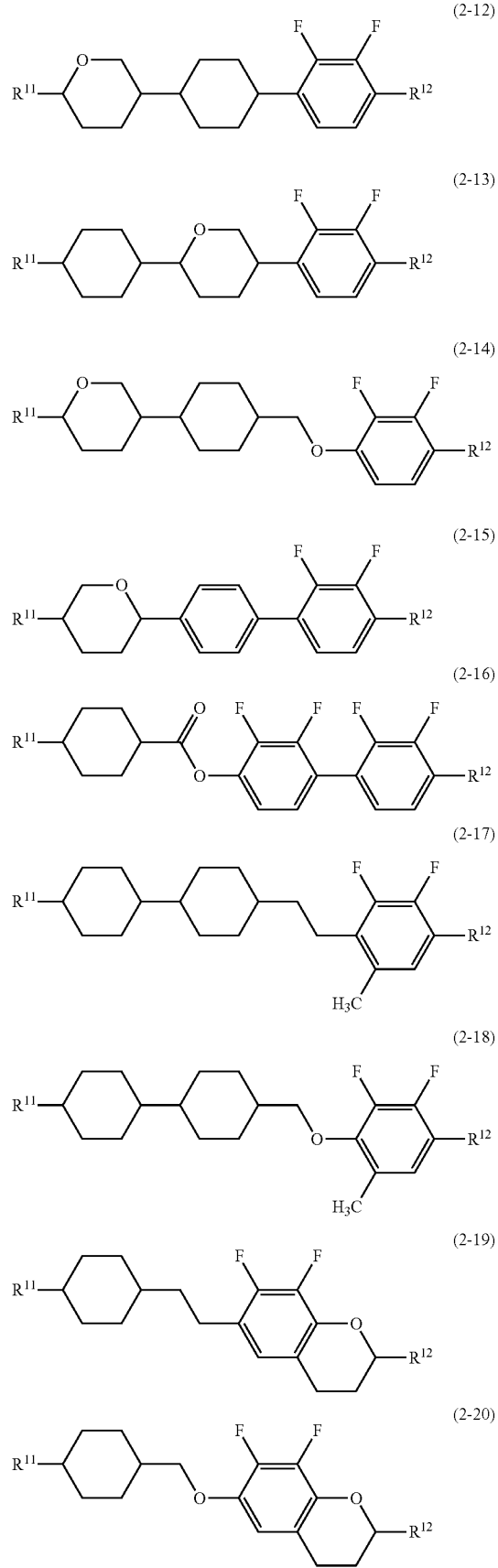

(2-21)
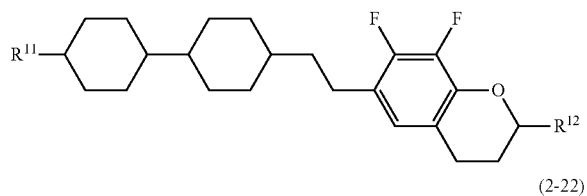

(2-22)
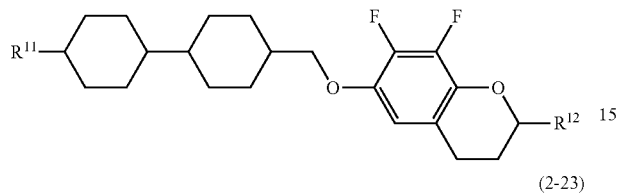

(2-23)
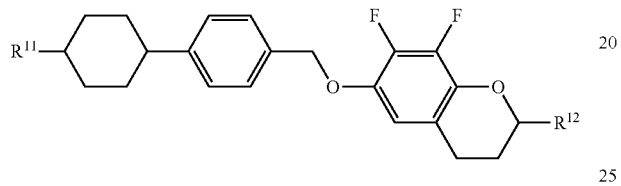

wherein $R^{11}$ and $R^{12}$ are independently alkyl having 1 to 12 carbons, alkoxy having 1 to 12 carbons or alkenyl having 2 to 12 carbons, or alkenyl having 2 to 12 carbons in which arbitrary hydrogen is replaced by fluorine.

6. The liquid crystal composition according to claim 4, wherein a ratio of the second component is in the range of 10% by weight to 90% by weight based on the weight of a liquid crystal composition excluding the first component.

7. The liquid crystal composition according to claim 1, further containing at least one compound selected from the group of compounds represented by formula (3) as a third component:

(3)
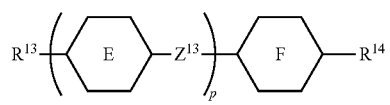

wherein $R^{13}$ and $R^{14}$ are independently alkyl having 1 to 12 carbons, alkoxy having 1 to 12 carbons or alkenyl having 2 to 12 carbons, or alkenyl having 2 to 12 carbons in which arbitrary hydrogen is replaced by fluorine; ring E and ring F are independently 1,4-cyclohexylene, 1,4-phenylene, 2-fluoro-1,4-phenylene or 3-fluoro-1,4-phenylene, $Z^{13}$ is independently a single bond, ethylene, methyleneoxy or carbonyloxy; and p is 1, 2 or 3.

8. The liquid crystal composition according to claim 7, wherein the third component is at least one compound selected from the group of compounds represented by formula (3-1) to formula (3-13):

(3-1)
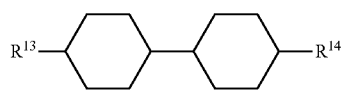

(3-2)
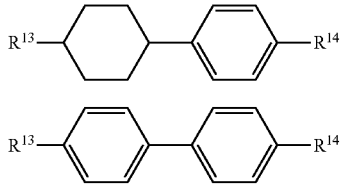

(3-3)
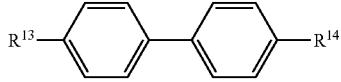

(3-4)
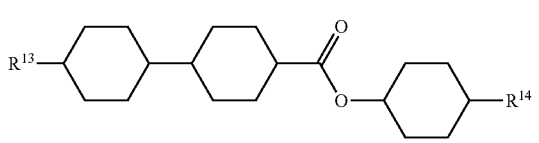

(3-5)
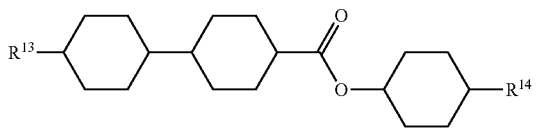

(3-6)
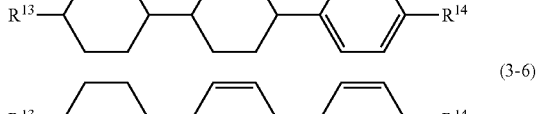

(3-7)
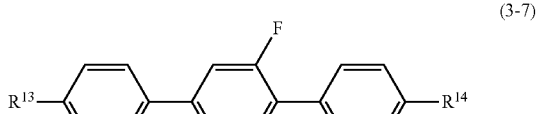

(3-8)
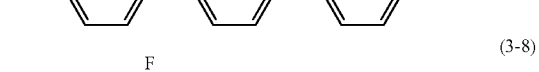

(3-9)
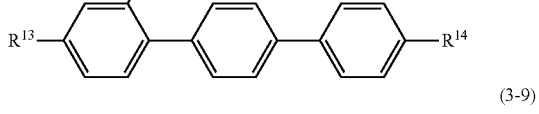

(3-10)
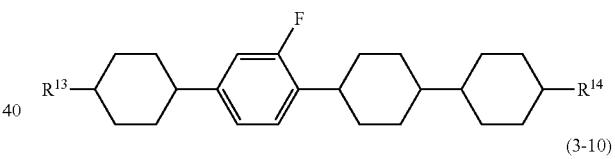

(3-11)
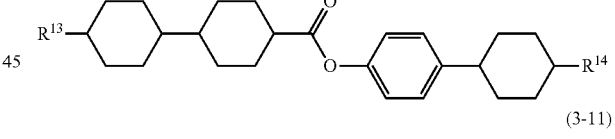

(3-12)
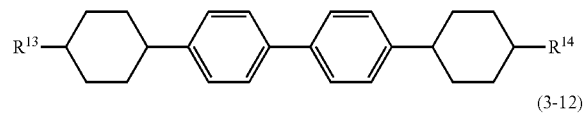

(3-13)
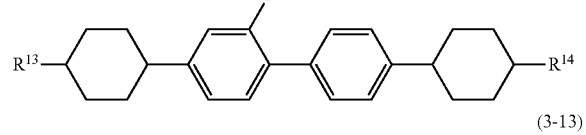

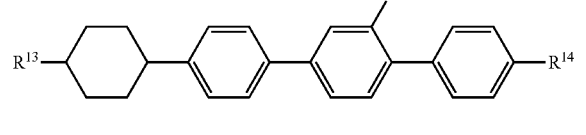

wherein $R^{13}$ and $R^{14}$ are independently alkyl having 1 to 12 carbons, alkoxy having 1 to 12 carbons or alkenyl having 2 to 12 carbons, or alkenyl having 2 to 12 carbons in which arbitrary hydrogen is replaced by fluorine.

9. The liquid crystal composition according to claim 7, wherein a ratio of the third component is in the range of 10% by weight to 90% by weight based on the weight of a liquid crystal composition excluding the first component.

10. The liquid crystal composition according to claim 1, further containing a polymerization initiator.

11. The liquid crystal composition according to claim 1, further containing a polymerization inhibitor.

12. The liquid crystal composition according to claim 1, wherein a maximum temperature of a nematic phase is 70° C. or higher, an optical anisotropy (25° C.) at a wavelength of 589 nanometers is 0.08 or more, and a dielectric anisotropy (25° C.) at a frequency of 1 kHz is −2 or less.

13. A liquid crystal display device, comprising two substrates including an electrode layer on at least one of the substrates, and arranging between the two substrates the liquid crystal composition according to claim 1.

14. The liquid crystal display device according to claim 13, wherein an operating mode in the liquid crystal display device is a TN mode, a VA mode, an IPS mode or a PSA mode, and a driving mode in the liquid crystal display device is an active matrix mode.

15. The liquid crystal composition according to claim 4, further containing at least one compound selected from the group of compounds represented by formula (3) as a third component:

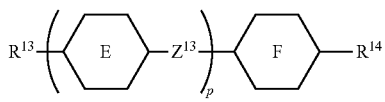

(3)

wherein $R^{13}$ and $R^{14}$ are independently alkyl having 1 to 12 carbons, alkoxy having 1 to 12 carbons or alkenyl having 2 to 12 carbons, or alkenyl having 2 to 12 carbons in which arbitrary hydrogen is replaced by fluorine; ring E and ring F are independently 1,4-cyclohexylene, 1,4-phenylene, 2-fluoro-1,4-phenylene or 3-fluoro-1,4-phenylene; $Z^{13}$ is independently a single bond, ethylene, methyleneoxy or carbonyloxy; and p is 1, 2 or 3.

16. The liquid crystal composition according to claim 15, wherein the third component is at least one compound selected from the group of compounds represented by formula (3-1) to formula (3-13):

(3-1)

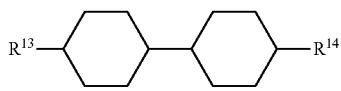

(3-2)

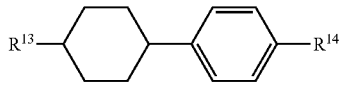

(3-3)

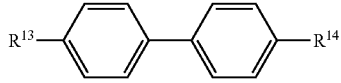

(3-4)

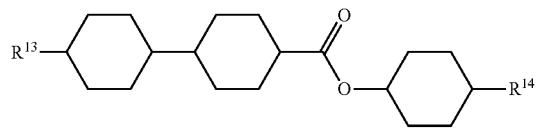

(3-5)

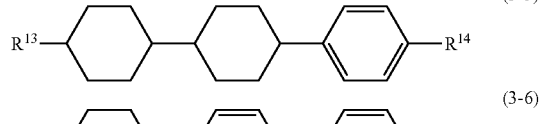

(3-6)

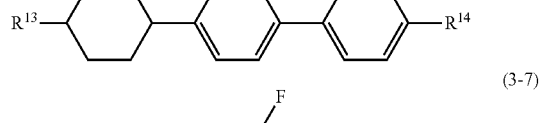

(3-7)

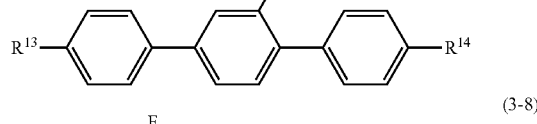

(3-8)

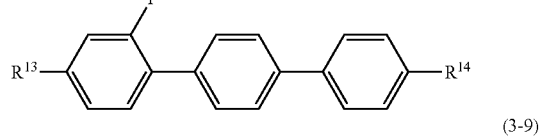

(3-9)

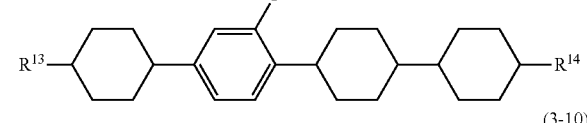

(3-10)

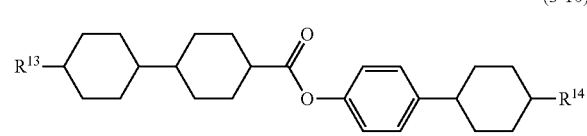

(3-11)

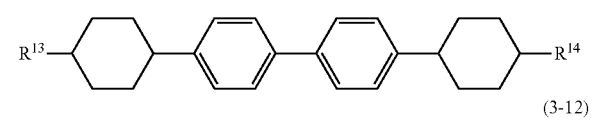

(3-12)

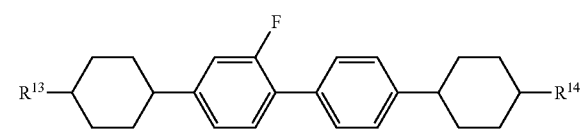

(3-13)

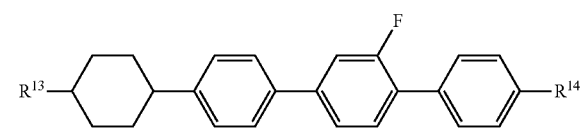

wherein $R^{13}$ and $R^{14}$ are independently alkyl having 1 to 12 carbons, alkoxy having 1 to 12 carbons or alkenyl having 2 to 12 carbons, or alkenyl having 2 to 12 carbons in which arbitrary hydrogen is replaced by fluorine.

17. The liquid crystal composition according to claim 15, wherein a ratio of the third component is in the range of 10% by weight to 90% by weight based on the weight of a liquid crystal composition excluding the first component.

* * * * *